United States Patent
Noguchi et al.

(10) Patent No.: US 8,230,191 B2
(45) Date of Patent: Jul. 24, 2012

(54) RECORDING MEDIUM STORING ALLOCATION CONTROL PROGRAM, ALLOCATION CONTROL APPARATUS, AND ALLOCATION CONTROL METHOD

(75) Inventors: Yasuo Noguchi, Kawasaki (JP);
Kazutaka Ogihara, Kawasaki (JP);
Masahisa Tamura, Kawasaki (JP);
Yoshihiro Tsuchiya, Kawasaki (JP);
Tetsutaro Maruyama, Kawasaki (JP);
Takashi Watanabe, Kawasaki (JP);
Tatsuo Kumano, Kawasaki (JP);
Kazuichi Oe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 272 days.

(21) Appl. No.: 12/651,522

(22) Filed: Jan. 4, 2010

(65) Prior Publication Data

US 2010/0191757 A1 Jul. 29, 2010

(30) Foreign Application Priority Data

Jan. 27, 2009 (JP) ................................. 2009-015470

(51) Int. Cl.
*G06F 12/02* (2006.01)
*G06F 17/30* (2006.01)
(52) U.S. Cl. ................................. 711/165; 707/999.205
(58) Field of Classification Search .................. 711/114, 711/165, 170, E12.002; 707/999.205, 758
See application file for complete search history.

(56) References Cited

U.S. PATENT DOCUMENTS

| 2006/0143418 A1* | 6/2006 | Takahashi et al. | 711/165 |
| 2007/0101083 A1 | 5/2007 | Ogihara et al. | |
| 2008/0091898 A1* | 4/2008 | Takahashi et al. | 711/162 |
| 2009/0240880 A1* | 9/2009 | Kawaguchi | 711/114 |
| 2009/0292870 A1* | 11/2009 | Sambe et al. | 711/114 |
| 2010/0042802 A1* | 2/2010 | Helman et al. | 711/173 |

FOREIGN PATENT DOCUMENTS

| JP | 2007-122463 | 5/2007 |
| JP | 2007-323589 | 12/2007 |

* cited by examiner

*Primary Examiner* — Hung T Vy
(74) *Attorney, Agent, or Firm* — Staas & Halsey LLP

(57) ABSTRACT

An allocation control apparatus allocates duplicate logical volume divided areas to virtual storage areas that do not have data storage area in the physical storage area. The apparatus associates identification information of the allocated virtual storage areas, of the duplicate logical volume divided areas, and of duplication source logical volume divided areas to be set in the management information. The apparatus detects, upon a data writing request, based on the management information, the unallocated real storage area in the logical volume divided area. The apparatus reallocates the real storage area to the duplicate logical volume divided area to update the management information. The apparatus identifies, based on the management information, the real storage area allocated to the duplication source logical volume divided area corresponding to the duplicate logical volume divided area. The apparatus copies data stored in the real storage area to the real storage area.

9 Claims, 24 Drawing Sheets

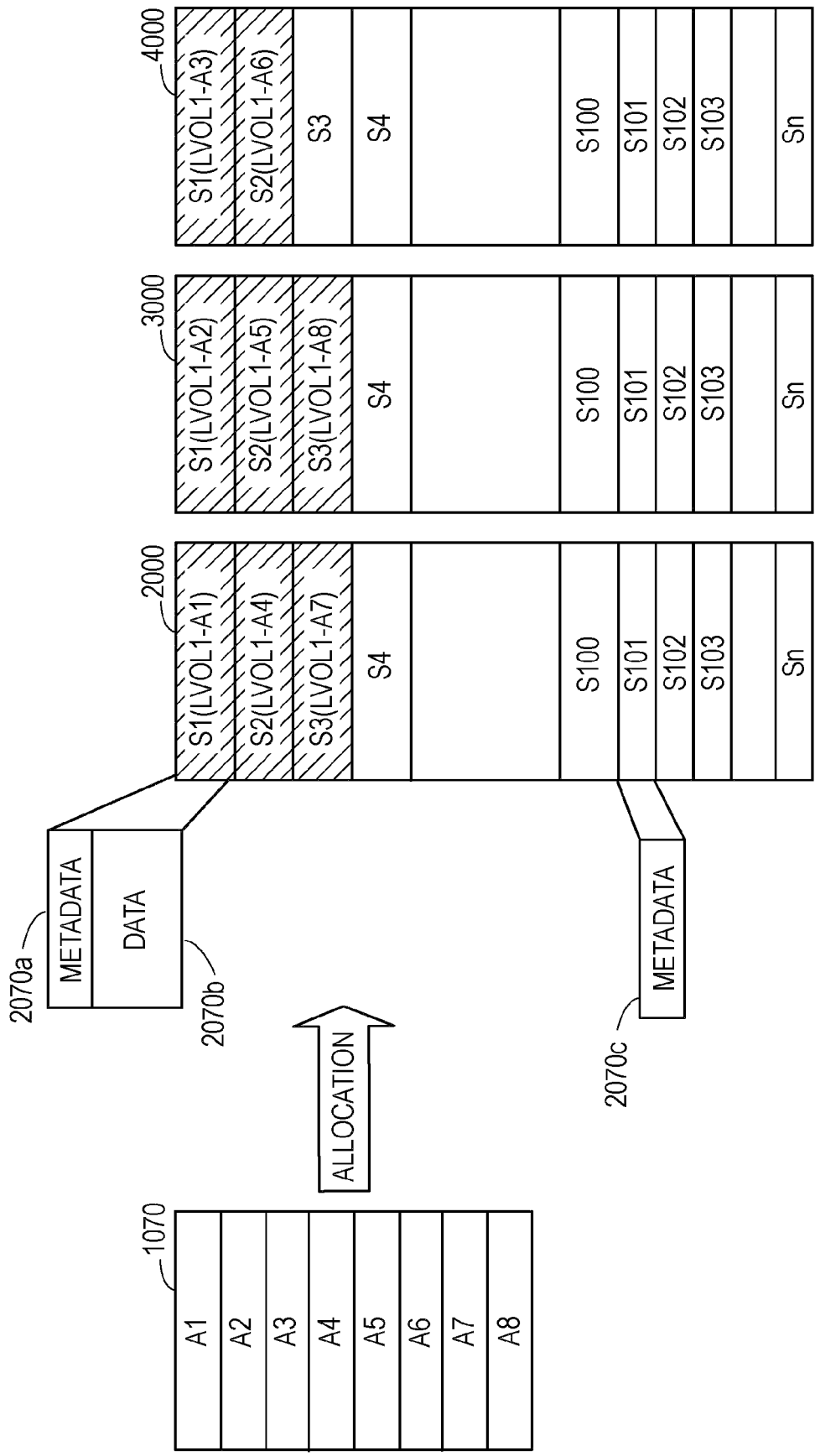

FIG. 6

| SLICE ACCESS INFORMATION | | DATA AREA FLAG | LOGICAL DISK ALLOCATION FLAG | DUPLICATE SLICE FLAG | LOGICAL DISK INFORMATION | | DUPLICATION SOURCE LOGICAL DISK INFORMATION | |
|---|---|---|---|---|---|---|---|---|
| DISK NODE ID | SLICE ID | | | | LOGICAL DISK ID | INITIAL ADDRESS | LOGICAL DISK ID | INITIAL ADDRESS |
| DP1 | 1 | TRUE | TRUE | FALSE | LVOL1 | A1 | NULL | NULL |
| DP1 | 2 | TRUE | TRUE | FALSE | LVOL1 | A4 | NULL | NULL |
| DP1 | 3 | TRUE | TRUE | FALSE | LVOL1 | A7 | NULL | NULL |
| ... | ... | | | | | | | |
| DP1 | 101 | FALSE | NULL | NULL | NULL | NULL | NULL | NULL |
| DP1 | 102 | FALSE | NULL | NULL | NULL | NULL | NULL | NULL |
| DP1 | 103 | FALSE | NULL | NULL | NULL | NULL | NULL | NULL |
| ... | ... | | | | | | | |
| DP2 | 1 | TRUE | TRUE | FALSE | LVOL1 | A2 | NULL | NULL |
| DP2 | 2 | TRUE | TRUE | FALSE | LVOL1 | A5 | NULL | NULL |
| DP2 | 3 | TRUE | TRUE | FALSE | LVOL1 | A8 | NULL | NULL |
| ... | ... | | | | | | | |
| DP2 | 101 | FALSE | NULL | NULL | NULL | NULL | NULL | NULL |
| DP2 | 102 | FALSE | NULL | NULL | NULL | NULL | NULL | NULL |
| DP2 | 103 | FALSE | NULL | NULL | NULL | NULL | NULL | NULL |
| ... | ... | | | | | | | |
| DP3 | 1 | TRUE | TRUE | FALSE | LVOL1 | A3 | NULL | NULL |
| DP3 | 2 | TRUE | TRUE | FALSE | LVOL1 | A6 | NULL | NULL |
| ... | ... | | | | | | | |
| DP3 | 101 | FALSE | NULL | NULL | NULL | NULL | NULL | NULL |
| DP3 | 102 | FALSE | NULL | NULL | NULL | NULL | NULL | NULL |
| DP3 | 103 | FALSE | NULL | NULL | NULL | NULL | NULL | NULL |
| ... | ... | | | | | | | |

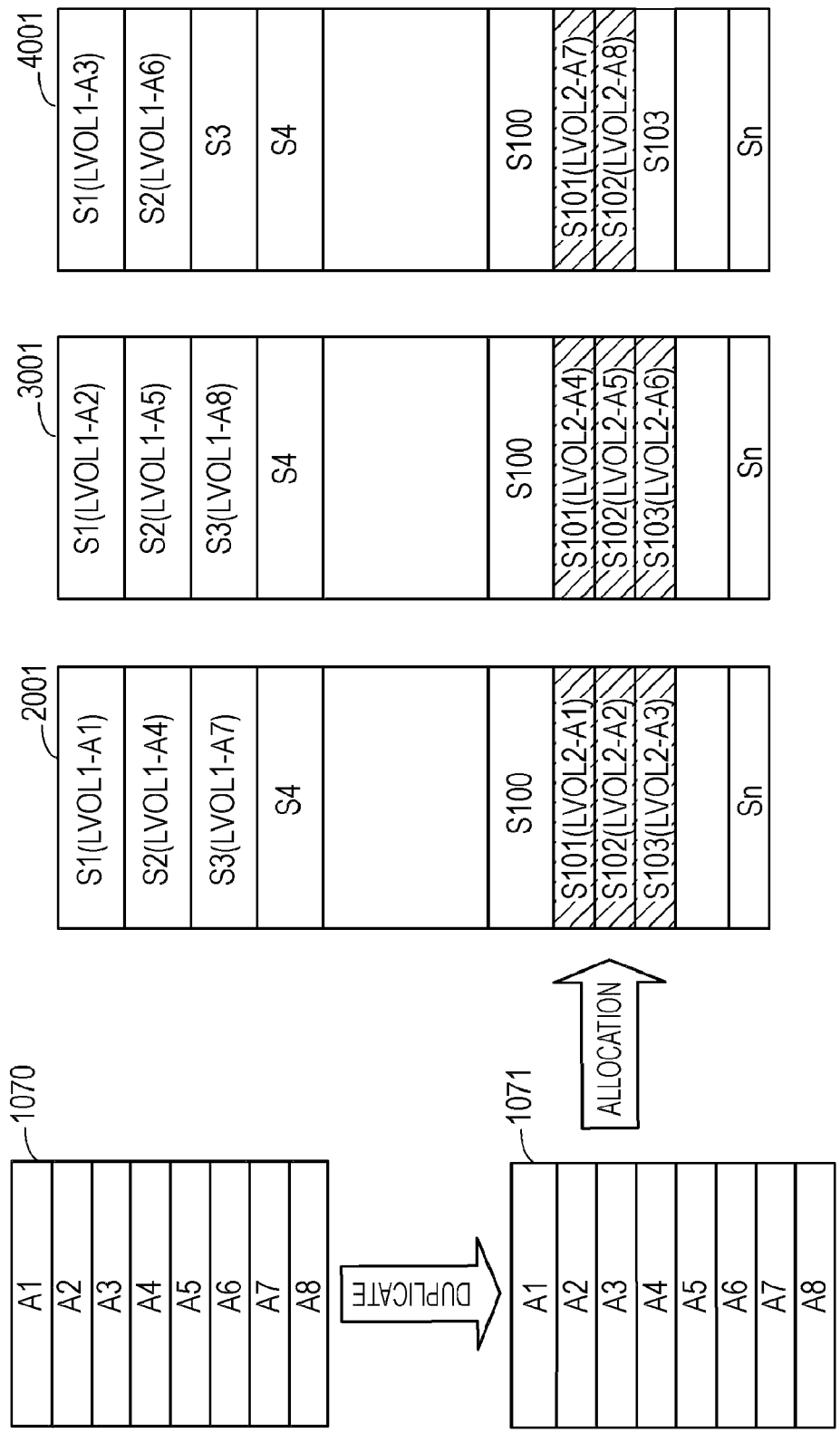

FIG. 9

| SLICE ACCESS INFORMATION | | DATA AREA FLAG | LOGICAL DISK ALLOCATION FLAG | DUPLICATE SLICE FLAG | LOGICAL DISK INFORMATION | | DUPLICATION SOURCE LOGICAL DISK INFORMATION | |
|---|---|---|---|---|---|---|---|---|
| DISK NODE ID | SLICE ID | | | | LOGICAL DISK ID | INITIAL ADDRESS | LOGICAL DISK ID | INITIAL ADDRESS |
| DP1 | 1 | TRUE | TRUE | FALSE | LVOL1 | A1 | NULL | NULL |
| DP1 | 2 | TRUE | TRUE | FALSE | LVOL1 | A4 | NULL | NULL |
| DP1 | 3 | TRUE | TRUE | FALSE | LVOL1 | A7 | NULL | NULL |
| ... | ... | | | | | | | |
| DP1 | 101 | FALSE | TRUE | TRUE | LVOL2 | A1 | LVOL1 | A1 |
| DP1 | 102 | FALSE | TRUE | TRUE | LVOL2 | A2 | LVOL1 | A2 |
| DP1 | 103 | FALSE | TRUE | TRUE | LVOL2 | A3 | LVOL1 | A3 |
| ... | ... | | | | | | | |
| DP2 | 1 | TRUE | TRUE | FALSE | LVOL1 | A2 | NULL | NULL |
| DP2 | 2 | TRUE | TRUE | FALSE | LVOL1 | A5 | NULL | NULL |
| DP2 | 3 | TRUE | TRUE | FALSE | LVOL1 | A8 | NULL | NULL |
| ... | ... | | | | | | | |
| DP2 | 101 | FALSE | TRUE | TRUE | LVOL2 | A4 | LVOL1 | A4 |
| DP2 | 102 | FALSE | TRUE | TRUE | LVOL2 | A5 | LVOL1 | A5 |
| DP2 | 103 | FALSE | TRUE | TRUE | LVOL2 | A6 | LVOL1 | A6 |
| ... | ... | | | | | | | |
| DP3 | 1 | TRUE | TRUE | FALSE | LVOL1 | A3 | NULL | NULL |
| DP3 | 2 | TRUE | TRUE | FALSE | LVOL1 | A6 | NULL | NULL |
| ... | ... | | | | | | | |
| DP3 | 101 | FALSE | TRUE | TRUE | LVOL2 | A7 | LVOL1 | A7 |
| DP3 | 102 | FALSE | TRUE | TRUE | LVOL2 | A8 | LVOL1 | A8 |
| DP3 | 103 | FALSE | NULL | NULL | NULL | NULL | NULL | NULL |
| ... | ... | | | | | | | |

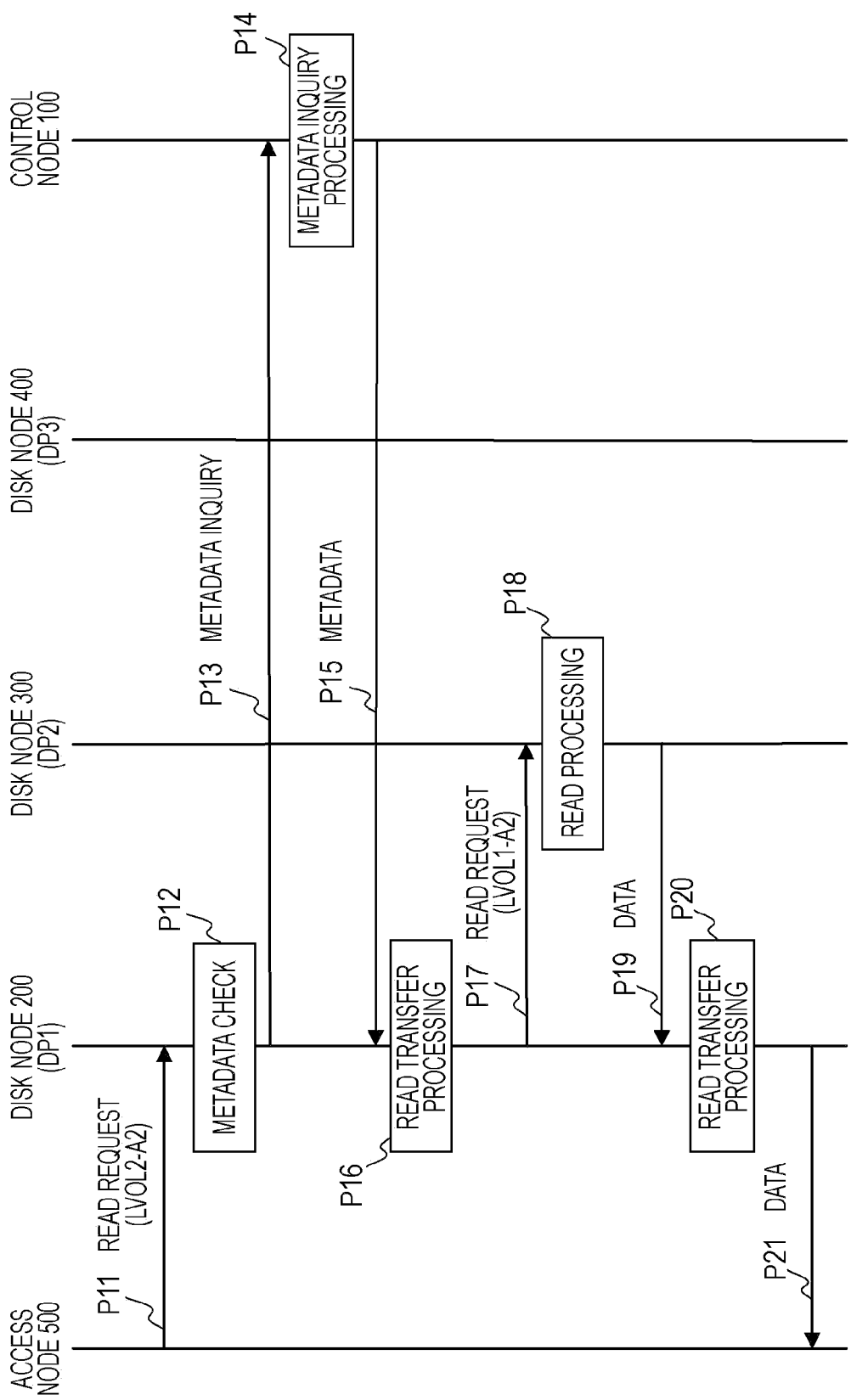

FIG. 12

| SLICE ACCESS INFORMATION || LOGICAL DISK INFORMATION ||
|---|---|---|---|
| DISK NODE ID | SLICE ID | LOGICAL DISK ID | INITIAL ADDRESS |
| DP2 | 1 | LVOL1 | A2 |
|  |  |  |  |

FIG. 19

| SLICE ACCESS INFORMATION | | LOGICAL DISK INFORMATION | |
|---|---|---|---|
| DISK NODE ID | SLICE ID | LOGICAL DISK ID | INITIAL ADDRESS |
| DP3 | 3 | LVOL2 | A2 |
|  |  |  |  |

RECORDING MEDIUM STORING ALLOCATION CONTROL PROGRAM, ALLOCATION CONTROL APPARATUS, AND ALLOCATION CONTROL METHOD

CROSS-REFERENCE TO RELATED APPLICATIONS

This application is based upon and claims the benefit of priority of the prior Japanese Patent Application No. 2009-15470, filed on Jan. 27, 2009, the entire contents of which are incorporated herein by reference.

BACKGROUND

1. Field

The embodiments discussed herein are related to an allocation control program embodied in a computer-readable medium for dispersedly arranging logical volumes in a plurality of storage apparatuses, and an allocation control apparatus and an allocation control method therefor.

2. Description of the Related Art

Up to now, a dispersion-type multi-node storage system has been proposed in which a plurality of storage apparatuses are dispersedly arranged on a network to function in cooperation for improving a performance and a reliability of the system. In the multi-node storage system, a virtual logical volume in accordance with a request from a client is generated. This logical volume is divided into predetermined divided areas to be allocated to physical storage areas of a plurality of storage apparatuses. At this time, management information having the divided area of the logical volume associated with the physical storage area allocated is stored in the storage apparatus together with data. On the basis of this management information, an access processing to the physical storage area is performed.

In such a multi storage system, for an operational convenience or the like, a case may occur in which the logical volume in operation is duplicated to create a duplicate logical volume. In a creation processing for the duplicate logical volume in the related art, first, a physical storage area of the storage apparatus is allocated while corresponding to the duplicate logical volume. Then, data of the logical volume at a duplication source is copied in the physical storage area of the storage apparatus allocated to the duplicate logical volume.

A method is proposed with which at the time of the copy processing, a link is set for the duplicate logical volume where the allocation is performed and the logical volume at the duplication source, and the data is copied on the basis of the link. For example, see Japanese Laid-open Patent Publication No. 2007-122463. This link is cut off after the end of the duplication.

Also, a method is proposed with which as to a duplication of a logical disk composed of a disk and a magnetic tape, a physical data copy on the tape is not performed, and only management information is copied to create another logical volume. For example, see Japanese Laid-open Patent Publication No. 2007-323589. According to this method, virtual logical volumes at the copy source and the copy destination share the physical storage area.

However, a problem occurs that the physical storage area of the duplication processing for allocating the logical volume and copying all the data of the logical volume at the duplication source takes much time for the copy. Also, in an area where the data of the duplicate logical volume is not updated, the same data is set for the logical volume at the duplication source and the logical volume at the duplication destination, which is also redundant.

On the other hand, a method of copying only the management information at the time of the duplication of the logical volume in the related art is difficult to be applied to a multi-node system where a plurality of computers function in cooperation to manage the physical storage area. In the multi-node storage system, as described above, the access processing is performed on the basis of the management information in which the physical storage areas dispersedly arranged in the respective storage apparatuses are associated with the divided areas of the logical volume. That is, on the basis of the management information, the physical storage area corresponding to an address of the logical volume where an access request occurs is identified to perform the access processing. For this reason, in a case where the access request destination is the duplicate logical volume, the duplicate data needs to be stored in the allocated physical storage area, and it is necessary to previously perform the copy processing to the duplicate logical volume described above.

In a case where the logical volume at the duplication source and the duplicate logical volume share the physical storage area, the physical storage area allocated to the logical volume at the duplication source needs to be set in the management information of the duplicate logical volume. However, this allocation is appropriately updated by the control apparatus, and the management information is also changed in accordance to this. As it is necessary to perform a complex processing in order to keep an up-to-date state of the management information stored in the storage apparatus, it is not simple for the duplicate logical volume and the logical volume at the duplication source to share the physical storage area.

In view of the above-mentioned circumstances and existing problems, it is an object to provide an allocation control program with which a creation time for a duplicate logical volume at a time of a duplication of a logical volume is shortened and also a utilization efficiency of a physical storage area is increased, an allocation control apparatus, and an allocation control method of implementing same.

SUMMARY

An allocation control method for an allocation control apparatus to dispersedly arrange a logical volume in a plurality of storage apparatuses. The apparatus allocates logical volume divided areas obtained by dividing the logical volume to real storage areas provided with a data storage area in a physical storage area of a storage apparatus group. The apparatus sets management information in which identification information of the allocated real storage areas is associated with identification information on the logical volume divided areas to be stored in a storage section.

The apparatus allocates, at a time of duplicating the logical volume, duplicate logical volume divided areas obtained by dividing a generated duplicate logical volume to virtual storage areas which do not have the data storage area in the physical storage area of the storage apparatus group. The apparatus associates identification information of the allocated virtual storage areas, the identification information of the duplicate logical volume divided areas, and identification information of duplication source logical volume divided areas corresponding to the duplicate logical volume divided areas to be set in the management information. The apparatus sends the management information to a storage management apparatus for managing the allocated virtual storage area. The apparatus detects, when a data writing request to the duplicate logical volume divided area to which the virtual storage area is allocated occurs, on the basis of the management information stored in the storage section, an unallocated real storage area in the logical volume divided area or the duplicate logical volume divided area. The apparatus reallocates the real storage area to the duplicate logical volume divided area where the writing request occurs to update the management information. The apparatus identifies, on the basis of the management information, the real storage area allocated to the duplication source logical volume divided area corresponding to the duplicate logical volume divided area. The apparatus copies data stored in the real storage area to the real storage area allocated to the duplicate logical volume divided area.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 5 is a slice allocation state of a disk node with respect to a logical disk;

FIG. 6 is an example of metadata showing the state of FIG. 5;

FIG. 8 is a slice allocation state example of a disk node after a duplicate logical disk is generated;

FIG. 9 is an example of metadata showing the state of FIG. 8;

FIG. 10 is a sequence diagram showing a read processing of a duplicate logical disk;

FIG. 12 is an example of duplication source slice information;

FIG. 19 is an example of metadata sent to an access node after a reallocation;

DETAILED DESCRIPTION OF EMBODIMENTS

Figure 1:
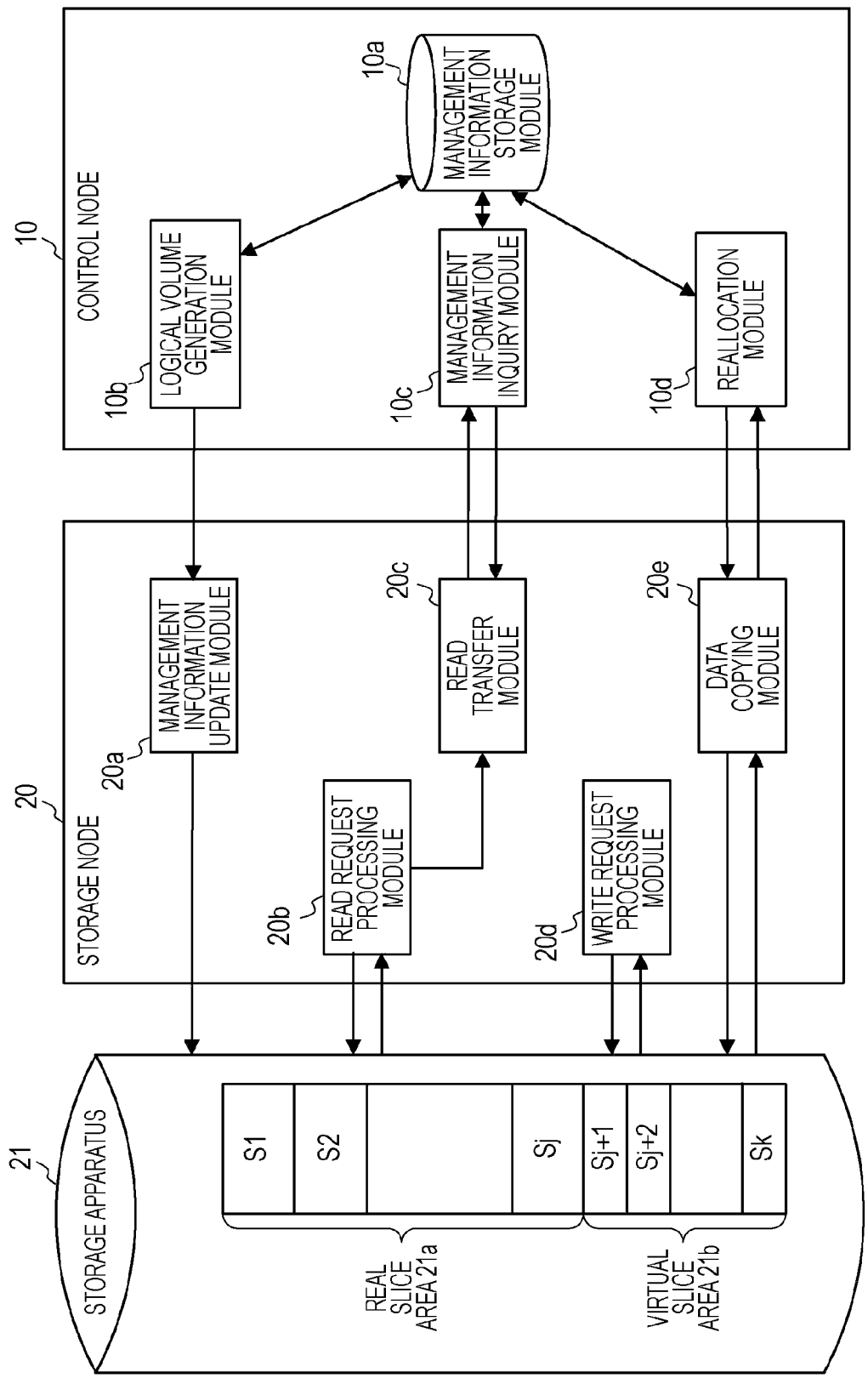
FIG. 1 is an example of a duplication processing for a logical volume applied to an embodiment.

Reference will now be made in detail to the embodiments, examples of which are illustrated in the accompanying drawings, wherein like reference numerals refer to the like elements throughout. The embodiments are described below to explain the present invention by referring to the figures.

First, an example of a duplication processing for a logical volume applied to an embodiment will be described, and thereafter a specific content will be described.

FIG. 1 is an example of a duplication processing for a logical volume applied to an embodiment.

This duplication processing for the logical volume is realized by a multi-node storage system having a control node 10 for performing a control of arranging a divided area of the logical volume to a physical storage area, a storage apparatus 21 provided with the physical storage area and a storage node 20 for managing the storage apparatus 21. It noted that the storage node 20 and the storage apparatus 21 in the drawing are representatives of a plurality of the storage nodes and a plurality of storage apparatuses, respectively.

First, the logical volume is described. The logical volume (also including a duplicate logical volume) is a virtual storage area generated in accordance with a request from a client. The logical volume is divided into divided areas with a predetermined storage capacity and managed. Hereinafter, this divided area is also referred to as segment.

Next, the storage apparatus 21 is described. The storage apparatus 21 has the physical storage area for storing data of the logical volume. This physical storage area is divided into divided areas and managed. Hereinafter, this divided area is referred to as slice. Also, the slice includes a real storage area provided with a data storage area for storing data of the segment (hereinafter, referred to as real slice) and a virtual storage area which does not have a data storage area (hereinafter, referred to as virtual slice). In FIG. 1, the slice is divided into two types of slice areas including a real slice area 21a and a virtual slice area 21b for management. The real slice area 21a is composed of a group of real slices where an area is secured for storing management information for managing the slice and data of the allocated segment. In the drawing, j pieces of real slice areas denoted by S1 to Sj (j is an arbitrary integer) are prepared for the physical storage area of the storage apparatus 21. In contrast to this, the virtual slice area 21b is composed of a group of virtual slices where an area is secured for only storing the management information for managing the slice. In the drawing, k pieces of areas denoted by Sj+1 to Sk (k is an arbitrary integer) are prepared for the physical storage area of the storage apparatus 21.

The control node 10 is next described in detail. The control node 10 functions as an allocation control apparatus for performing an allocation control of dividing the logical volume in units of segment to be allocated to any one of the real slice area 21a and the virtual slice area 21b of the storage apparatus 21. The control node 10 has a management information storage module 10a, a logical volume generation module 10b, a management information inquiry module 10c, and a reallocation module 10d.

The management information storage module 10a stores segments where the logical volume is divided at a predetermined storage capacity and management information for associating the slice of the storage apparatus 21 allocated to the segment. To the segment, one of a real slice and a virtual slice is allocated. In the management information, for each slice, a slice type, identification information of the corresponding segment, segment information at the duplication source, and the like are set. For the slice type, information is registered which is related to a slice indicating whether this slice is a real slice or a virtual slice and whether this slice is a duplicate slice or not. In the identification information of the corresponding segment, identification information of the segment where this slice is allocated (for example, an address indicating a segment area in the logical volume) is set. Furthermore, when this slice is the duplicate slice, the segment information at the duplication source corresponding to the duplicate slice is set. In the segment information at the duplication source, when this slice is the duplicate slice, identification information at the duplication source segment is set.

When a logical volume generation request is received from a management apparatus which is not shown, the logical volume generation module 10b performs a processing of allocating slices to the respective segments where the logical volume is divided. At this time, a case in which a duplication of the logical volume is requested is described. When the generation request of the duplicate logical volume is obtained, the logical volume generation module 10b reads out the management information from the management information storage module 10a to search for a virtual slice where the segment is unallocated. Then, the logical volume generation module 10b allocates the detected virtual slice to the segment where the duplicate logical volume is divided. Subsequently, the identification information on the segment of the duplicate logical volume corresponding to this virtual slice, the segment information at the duplication source corresponding to this segment or the like is set in the management information. The management information is stored in the management information storage module 10a and also sent to the storage node which manages this virtual slice (for example, the storage node 20). The storage node 20 receiving the management information stores the management information in the corresponding virtual slice.

The management information inquiry module 10c receives address information on the duplication source logical volume together with an inquiry asking of the management information from a read transfer module 20c of the storage node 20 and starts the processing. The management information inquiry module 10c searches for the management information related to the duplication source logical volume as a target to be stored in the management information storage module 10a. The management information inquiry module 10c extracts the real slice information where the segment data of the duplication source logical volume is stored and returns to the read transfer module 20c.

The reallocation module 10d reallocates the segment of the duplicate logical volume allocated to the virtual slice to the real slice. When a data writing request with respect to the virtual slice is issued from the access apparatus, the storage node 20 returns the unallocation error response to the access apparatus. The access apparatus receiving unallocation error response performs a reallocation request of the slice with respect to the segment of the target duplicate logical volume to the control node 10. In response to this reallocation request, the reallocation module 10d starts the processing.

In the reallocation module 10d, on the basis of the management information stored in the management information storage module 10a, the real slice where a segment is unallocated is searched for. The segment where the reallocation request occurs is allocated to the real slice thus detected. For example, it is supposed that the real slice in the real slice area 21a of the storage apparatus 21 is allocated. At this time, the allocated real slice does not store duplication source segment data, and thus on the basis of the management information, the real slice storing the duplication source segment data is identified. As the management information storage module 10a stores the management information related to all the slices managed by the control node 10, on the basis of the identification information on the duplication source segment, it is possible to identify the real slice storing this data. The duplication source and the duplication destination are instructed to a storage node which manages the thus identified real slice to perform a data duplication request. The storage node receiving the request reads out the data of the real slice at the duplication source to be copied to the real slice at the duplication destination managed by the storage node 20. When a storage node for managing the real slice at the duplication source is other than the storage node 20, the relevant storage node performs a writing request to the storage node 20. With this configuration, it is possible to perform the data writing to the segment of the duplicate logical volume where the slice allocation request occurs.

The storage node 20 functions as a storage management apparatus for managing the storage apparatus 21. The storage node 20 has a management information update module 20a, a read request processing module 20b, the read transfer module 20c, a write request processing module 20d, and a data copying module 20e.

The management information update module 20a obtains the management information updated by the logical volume generation module 10b and updates the management information on the relevant slice of the storage apparatus 21.

When a data read request is received from the access apparatus which is not shown, the read request processing module 20b reads out the management information corresponding to the specified slice to determine whether this slice is the real slice or the virtual slice. In the case of the real slice, the requested data is read out, and the read out data is returned to the access apparatus. In the case of the virtual slice, the segment information at the duplication source is extracted from the management information, and the read transfer module 20c takes over the processing.

On the basis of the segment information at the duplication source received from the read request processing module 20b, the read transfer module 20c requests information on the duplication source slice corresponding to the segment at the duplication source to the management information inquiry module 10c of the control node 10. Then, on the basis of the obtained information on the duplication source slice, the read transfer module 20c performs a read request of the relevant data to the storage node which manages this duplication source slice. The requested storage node reads the data from the real slice where a read request processing module corresponds and returns a response to the storage node 20 at the request source. The read transfer module 20c of the storage node 20 transfers the obtained data to the access apparatus. It is noted that the information on the duplication source slice obtained from the management information inquiry module 10c is associated with the duplication source segment to be stored in a storage module. After that, in a case where a read request with respect to the same duplication source segment is accepted, a data read request is performed to the storage node which manages the duplication source slice on the basis of this information. When an error occurs as the allocation is changed by the control node 10 and the duplication source slice is changed, latest information is obtained from the management information inquiry module 10c again. Then, a similar processing to that performed when the information on the duplication source slice is obtained for the first time is performed.

When the data write request is received from the access apparatus which is not shown, the write request processing module 20d reads out the management information corresponding to the specified slice and determines whether this slice is the real slice or the virtual slice. In the case of the real slice, the requested data is written to the relevant area. In the case of the virtual slice, the unallocation error is returned to the access apparatus. It is noted that in a case where a write request of the duplicate data is accepted from another storage node through the data duplication processing, the requested data is written to the relevant area.

When the data duplication request is received from the reallocation module 10d of the control node 10, the data copying module 20e performs a processing of copying the data of the slice at the duplication source thus specified to the real slice at the duplication destination. When the real slice at the duplication destination is another storage node, the read out data is sent to the storage node which manages the real slice at the duplication destination to perform a writing request. With this configuration, it is possible to perform the data writing to the segment of the duplicate logical volume where the slice allocation request occurs.

A generation processing for a duplicate logical disk in such a multi-node storage system is described.

For example, via a management node which is not shown, a duplication request of the logical volume is input to the control node 10. In the control node 10, the logical volume generation module 10b receives the generation request of the duplicate logical volume and searches for the management information stored in the management information storage module 10a, and the segment extracts the unallocated virtual slice. Then, for each segment obtained by dividing the duplicate logical volume, the extracted virtual slice is allocated. At this time, in association with the virtual slice where the segment is allocated, the management information including the identification information on the segment of the duplicate logical volume and the identification information on the segment of the corresponding logical volume is generated and stored in the management information storage module 10a. Also, the generated management information is sent respectively to the storage nodes which manage the virtual slice to which the segment is allocated. In this manner, the virtual slice is allocated to the segment, and the management information is updated, so that the duplicate logical volume in accordance with the request is constructed in the multi-node storage system. At this time point, a processing of copying the data of the logical volume at the duplication source to the duplication destination logical volume is not carried out. As a result, it is possible to shorten a period of time for creating the duplicate logical volume.

An operation at a time when the thus generated duplicate logical volume has a data read/write request is described. The read/write request is issued from the access apparatus to the storage node 20 which manages the virtual slice corresponding to a request address of the duplicate logical volume.

The read request is input to the read request processing module 20b of the storage node 20. When the address where the read out is specified exists in the real slice area 21a the read request processing module 20b reads out from the relevant address and returns the read out data to the access apparatus. When the address where the read out is specified exists in the virtual slice area 21b, as the relevant data does not exist in the storage apparatus 21, a data transfer request is performed to the read transfer module 20c. The read transfer module 20c reads out the management information on the relevant virtual slice and extracts the logical volume information at the duplication source where identification information on the duplication source segment. Then, together with the extracted logical volume information at the duplication source, a management information inquiry request is sent to the control node 10. The management information inquiry module 10c of the control node 10 searches for the management information of the management information storage module 10a on the basis of the received logical volume information at the duplication source to identify the real slice at the corresponding duplication source, and notifies the storage node 20 of this duplication source slice information as a response.

The read transfer module 20c performs the read request with respect to the storage node which manages the identified duplication source slice and transfers the obtained data to the access apparatus as a response. It is noted that the duplication source slice information obtained from the management information inquiry module 10c is stored in the storage module in association with the identification information on the segment of the corresponding logical volume at the duplication source. Then, when the read request occurs for the same segment again, the slice at the duplication source is identified by using the information stored in the storage module to perform a read transfer processing. In this manner, in response to the read request, the read out data is transferred from the slice at the duplication source. That is, as the data area of the segment where the duplicate logical volume is not updated (data write is not performed) is shared with the duplication source, a redundant configuration is avoided.

Next, the write request is input to the write request processing module 20d of the storage node 20. When the address where the data writing is specified is at the real slice area 21a, the write request processing module 20d writes in the data at the relevant address and returns the response to the access apparatus. When the address where the data writing is specified is at the virtual slice area 21b, as the relevant data does not exist in the storage apparatus 21, the slice unallocation error response is returned to the access apparatus. The access apparatus receiving the unallocation error performs the reallocation request of the slice with respect to the control node 10.

In the control node 10 obtaining the reallocation request, the reallocation module 10d performs the slice reallocation processing with respect to the segment of the duplicate logical volume having the error. First, from the management information stored in the management information storage module 10a, the real slice where the segment is unallocated is detected. The segment of the duplicate logical volume where the reallocation request occurs is allocated to the detected real slice to update the management information. The management information is sent to the storage node which newly manages the allocated real slice. Subsequently, the reallocation module 10d identifies the real slice storing the duplication source segment data. Then, a copy request of the data is performed to the storage node which manages the real slice at the identified duplication source by specifying the reallocated real slice at the duplication destination. In a case where the storage node 20 receives the data copy request, the data copying module 20e sends the data of the relevant real slice at the duplication source to the specified real slice at the duplication destination to ask for the data writing to this slice. The data writing processing is performed by a data copying module or a write request processing module on the other side. Thus, the update target segment is reallocated to the real slice, and after the data is copied, the allocation of the original virtual slice is cancelled. After that, when the data writing request occurs in the same segment of the duplicate logical volume, the data stored in the reallocated real slice is updated. In this manner, the real slice is newly allocated to only the segment where the update request occurs, and the data writing is performed. With this configuration, as the real slice is reallocated when needed, the use efficiency of the real storage area can be increased.

Figure 2:
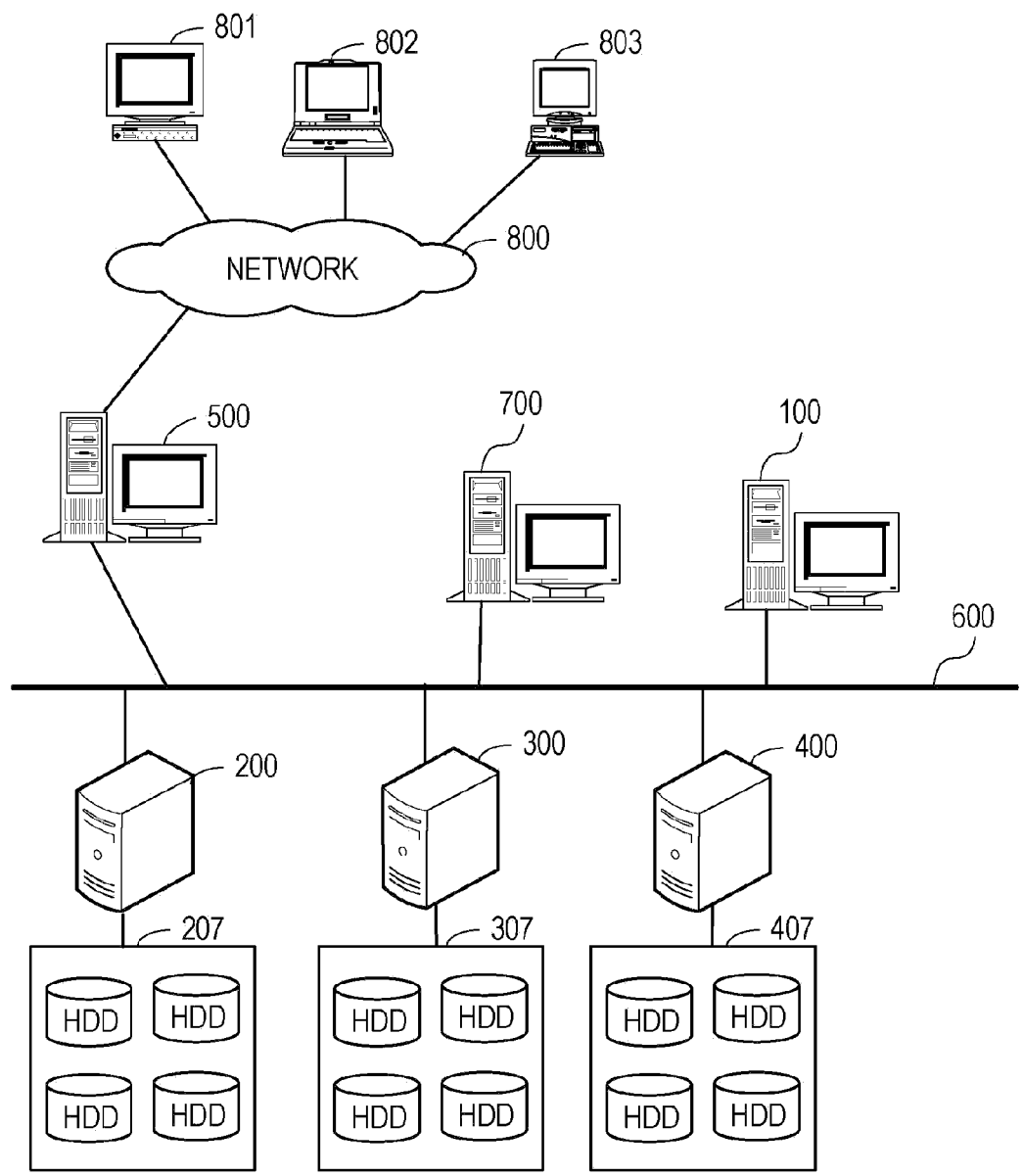
FIG. 2 is a configuration example of a multi-node storage system according to an embodiment.

Hereinafter, a description will be given to an embodiment of the invention in a case where the multi-node storage system in which the storage apparatus is configured of the disk apparatus. FIG. 2 is a configuration example of a multi-node storage system according to an embodiment.

In the multi-node storage system, via a network 600, the control node 100, a plurality of disk nodes 200, 300, and 400, an access node 500, and a management node 700 are connected.

The control node 100 performs an allocation processing for allocating a segment where a virtual logical disk is divided to disks 207, 307, and 407 provided with the physical storage area. When a duplication instruction of the logical disk is input, a duplicate logical disk is newly created, and segments of the duplicate logical disk are allocated to the virtual slices managed by the disk nodes 200, 300, and 400. Also, as the occasion demands, a rearrangement of the segments allocated to the respective slices of the disks 207, 307, and 407 is performed. For example, when an access request to the disk nodes 200, 300, and 400 by the access node 500 fails, the rearrangement of the segments is performed in accordance with the reallocation request from the access node 500.

The disk 207 is connected to the disk node 200, the disk 307 is connected to the disk node 300, and the disk 407 is connected to the disk node 400. To the disk 207, a plurality of hard disk drives (HDD) constituting the physical storage area are mounted. The same also applies to configurations of the disks 307 and 407. The physical storage areas of the disks 207, 307, and 407 are divided in units of slice and respectively managed by the disk nodes 200, 300, and 400. The slice includes the real slice provided with an area for storing the segment data and the management information related to the slice (hereinafter, referred to as metadata) and the virtual slice provided with only an area for storing the metadata. The disk nodes 200, 300, and 400 are, for example, computers based on an architecture called IA (Intel Architecture, for example). Then, on the basis of the metadata stored in the connected disks 207, 307, and 407, the segment data is provided via the access node 500 to terminal apparatuses 801, 802, and 803.

To the access node 500, via a network 800, the plurality of terminal apparatuses 801, 802, and 803 are connected. The access node 500 recognizes a storage location of data respectively managed by the disk nodes 200, 300, and 400 and performs a data access to the disk nodes 200, 300, and 400 in response to the request from the terminal apparatuses 801, 802, and 803. At the time of the read request, when the data reading from the access destination disk nodes 200, 300, and 400 fails, the latest access destination information (metadata) is obtained from the control node 100 to perform the data read out again. At the time of the write request, when the unallocation error is received from the access destination disk nodes 200, 300, and 400, the slice reallocation request of the target segment is performed to the control node 100. Then, the data writing is performed at the newly allocated access destination.

The management node 700 manages the entirety of the multi-node storage system. Also, while following an instruction from a user, the control node 100 is notified of an instruction such as a duplication request of the logical volume.

Next, a hardware configuration of the respective nodes will be described by taking the disk node 200 as an example.

Figure 3:
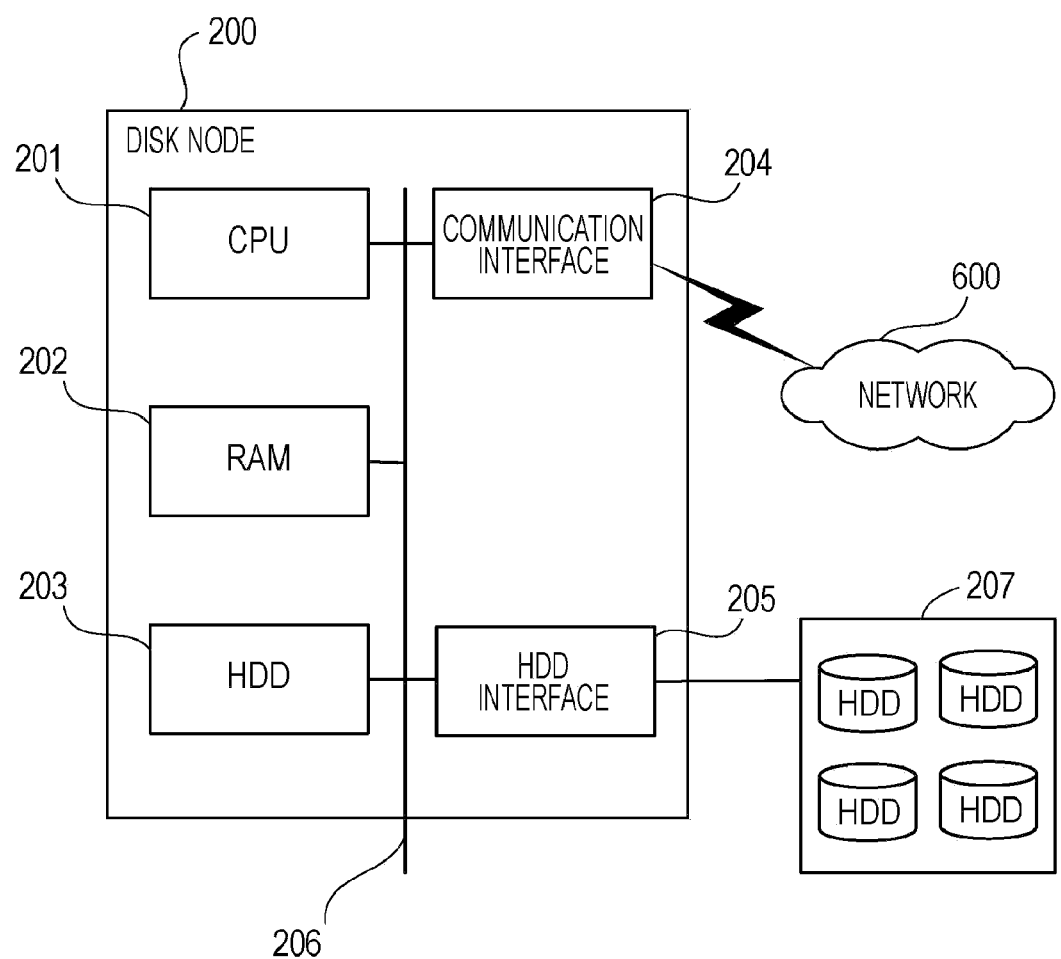
FIG. 3 is a hardware configuration example of a disk node.

FIG. 3 is a hardware configuration example of a disk node.

In the disk node 200, the entire apparatus is controlled by a CPU (Central Processing Unit) 201. To the CPU 201, via a bus 206, a RAM (Random Access Memory) 202, an HDD 203, a communication interface 204, and an HDD interface 205 are connected.

In the RAM 202, at least a part of an OS or an application program executed by the CPU 201 is temporarily stored. Also, the RAM 202 stores various pieces of data necessary for the CPU 201 to perform a processing. The HDD 203 stores programs of the OS and application. The communication interface 204 is connected to the network 600. The communication interface 204 performs data sending and reception via the network 600 with other computers constituting the multi-node storage system such as the disk node 300, 400, the access node 500, the control node 100, and the management node 700. The HDD interface 205 performs an access processing to the HDD constituting the disk 207.

It is noted that FIG. 3 is the hardware configuration of the disk node, but hardware configurations of the control node and the access node are also similar.

Next, the respective units for performing the duplicate logical disk creation processing in the above-mentioned multi-node storage system are described in detail. The following description of an operation of respective units is based on that update of the logical disk at the duplication source is prohibited as cache data of the access node 500 is already synchronized.

Figure 4:
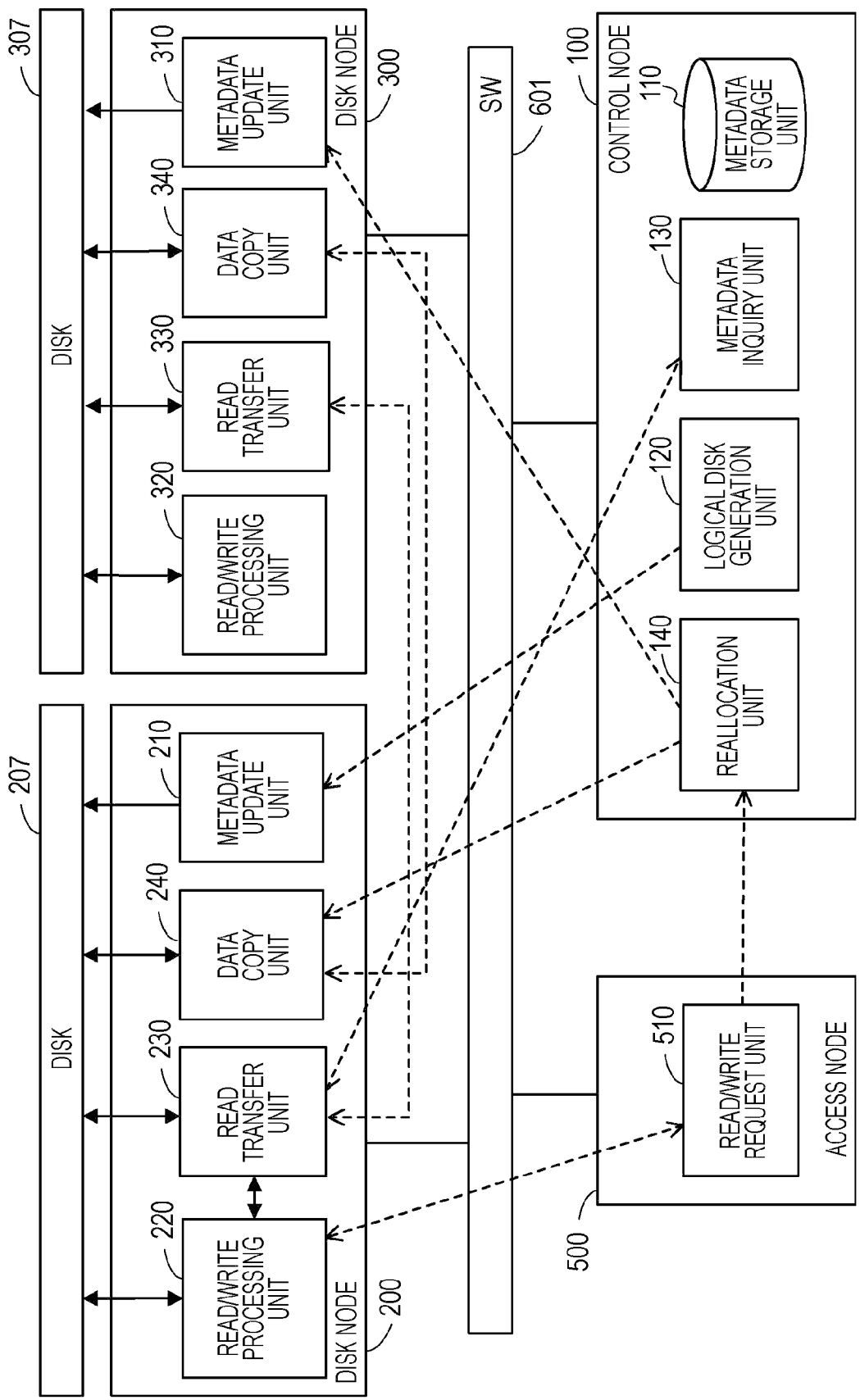
FIG. 4 is a configuration of respective units for performing a duplicate logical disk creation processing in a multi-node storage system.

FIG. 4 is a software configuration of the respective units for performing the duplicate logical disk creation processing in the multi-node storage system. The same part as that in FIG. 2 is denoted by the same numeral, and a description thereof will be omitted. In FIG. 4, the disk node 400 is omitted, but a software configuration thereof is similar to the disk nodes 200 and 300.

The disk nodes 200 and 300 perform a data exchange via a switch (SW) 601 with the control node 100 and the access node 500. Dotted arrows in the drawing represent data exchanged between the respective apparatuses. However, the data exchange between the disk node 300 and the control node 100 and the access node 500 is similar to that of the disk node 200 and is omitted.

The control node 100 has a metadata storage unit 110, a logical disk generation unit 120, a metadata inquiry unit 130, and a reallocation unit 140. The metadata storage unit 110 functions as the management information storage module 10a and stores metadata in which the management information on the slice such as information related to the slice type or the allocated segment is described. The logical disk generation unit 120 functions as the logical volume generation module 10b and generates the logical disk and the duplicate logical disk. The metadata inquiry unit 130 functions as the management information inquiry module 10c and inquires the metadata in accordance with the request from the disk nodes 200, 300, and 400 and the access node 500. The reallocation unit 140 functions as the reallocation module 10d and performs the slice reallocation of the requested segment.

The disk nodes 200 and 300 has metadata update units 210 and 310, read/write processing units 220 and 320, read transfer units 220 and 330, and data copy units 240 and 340. The metadata update units 210 and 310 functions as the management information update module 20a and updates metadata of the slices of the disks 207 and 307 under the management on the basis of the instruction from the control node 100. The read/write processing units 220 and 320 function as the read request processing module 20b and the write request processing module 20d and processes the read/write request to the disks 207 and 307. The read transfer units 220 and 330 function as the read transfer module 20c and reads out the duplication source slice corresponding to the data of the virtual slice to be transferred to the access node 500. The data copy units 240 and 340 function as the data copying module 20e and copies the data of the duplication source slice to the duplication destination slice.

The access node 500 has the read/write request unit 510. The read/write request unit 510 processes the access request on the basis of the metadata stored in a metadata storage unit which is not shown. An access request is performed to the disk nodes 200, 300, and 400 which manage the slice allocated to the logical disk where the access request is issued from the terminal apparatuses 801, 802, and 803. A read request to the duplicate logical disk is sent to the disk nodes 200, 300, and 400 which manage the slice allocated to the duplicate logical disk, and the read data obtained as a response is sent to the read request source. The write request to the duplicate logical disk is sent to the disk nodes 200, 300, and 400 which manage the slice allocated to the duplicate logical disk. When the unallocation error response is obtained from the disk nodes 200, 300, and 400, a reallocation of the slice is requested to the control node 100.

A flow of the data in the thus configured multi-node storage system is described.

When the creation of the duplicate logical disk is instructed, the logical disk generation unit 120 allocates the unallocated virtual slice of the disk nodes 200 and 300 to the segment of the duplicate logical disk to update the metadata. This updated metadata is sent to the metadata update units 210 and 310 of the disk nodes 200 and 300 where at least the metadata of the slice under the management is updated. The metadata update units 210 and 310 write the obtained updated metadata in the metadata storage area of the target slice. Thus, the related metadata is updated, and the creation of the duplicate logical disk is ended.

The access processing to the generated duplicate logical disk is described. As described above, on the basis of the metadata, the access node 500 sends the access request to the duplicate logical disk to the disk nodes 200, 300, and 400 which manage the virtual slice allocated to the duplicate logical disk.

A read/write request unit 510 of the access node 500 receiving the read request identifies the slice at the request destination on the basis of the metadata and performs the read request to the disk nodes 200 and 300 which manage this. A read/write processing unit 220 of the disk nodes 200 and 300 receives the read request, but the virtual slice at the read request destination does not have the data, and thus the read transfer units 220 and 330 takes over the processing. The read transfer units 220 and 330 obtain information on the slice at the duplication source from the metadata inquiry unit 130 of the control node 100. For example, it is supposed that a read transfer unit 230 of the disk node 200 obtains information from the metadata inquiry unit 130 that the duplication source slice exists in the disk node 300. The read transfer unit 230 performs a read request of the duplication source slice to a read/write processing unit 320 of the disk node 300. Then, the obtained data is transferred to the access node 500.

The read/write request unit 510 of the access node 500 receiving the write request identifies the slice at the request destination on the basis of the metadata and performs the write request to the disk nodes 200 and 300 which manage this. The read/write processing unit 220 of the disk nodes 200 and 300 receives the write request, but the virtual slice at the write request destination does not have the data, and thus the unallocation error is returned. The read/write request unit 510 obtaining the unallocation error asks the control node 100 for the reallocation of the real slice to the target segment. In the control node 100, the reallocation unit 140 reallocates the segment allocated to the virtual slice to the real slice to update the metadata. Furthermore, the disk nodes 200 and 300 which manage the real slice allocated to the segment at the duplication source corresponding to the segment of the write request destination are asked for the copy of the segment data at the duplication source. For example, when the real slice of the disk node 300 is reallocated to the segment of the duplicate logical volume where the write request occurs, the metadata in which this real slice is associated with the segment is sent to the disk node 300. The metadata update unit 310 obtaining this updates the metadata. Also, the disk node at the duplication source (for example, the disk node 200) is asked for the data copy of the slice at the duplication source. The data copy unit 240 reads out the data of the slice at the duplication source to be sent to the disk node 300 at the duplication destination. The data copy unit 340 of the disk node 300 obtaining this writes the received data in the reallocated slice and end the copy. In this way, the reallocation is ended, and thereafter, the write processing by the read/write processing unit 320 can be performed. Thus, after the segment of the duplicate logical disk is allocated to the real slice, the read/write processing is directly performed on this real slice.

Hereinafter, the operation will be described in detail while using a specific example.

First, a relation between the logical disk and the slices managed by the disk nodes 200, 300, and 400 is described. FIG. 5 is a slice allocation state of the disk node with respect to the logical disk.

A logical disk (ID=LVOL1) 1070 is a logical disk at the duplication source and composed of eight segments. Initial addresses of the respective segments are set as A1, A2, A3, A4, A5, A6, A7, and A8, and the respective segments are discriminated by the logical disk ID and the initial address. For example, the segment at the lowest-numbered address of the logical disk 1070 is LVOL1-A1.

The disk node 200 has a disk node ID of "DP1", and two types of slices including slices S1 to 100 and slices S101 to n. The slices S1 to 100 are real slices having a metadata area 2070a for storing metadata and a data area 2070b for storing data of the segment. The slices S101 to n are virtual slices which only have a metadata area 2070c for storing metadata without data area. The disk node 300 has a disk node ID of "DP2", and the configuration is similar to the disk 200. The disk node 400 has a disk node ID of "DP3", and the configuration is similar to the disk 200.

Herein, a slice allocation (DP1) 2000 of FIG. 5 is a state in which the segments of the logical disk (LVOL1) 1070 are allocated to the respective slices of the disk node (DP1) 200. Similarly, a slice allocation (DP2) 3000 is an allocation state of the segments to the disk node (DP2) 300, and a slice allocation (DP3) 4000 is an allocation state of the segments to the respective slices of the disk node (DP3) 400.

For example, the segment LVOL1-A1 is allocated to the slice S1 of the disk node (DP1) 200. Similarly, a segment LVOL1-A2 is allocated to the slice S1 of the disk node (DP2) 300, a segment LVOL1-A3 is allocated to the slice S1 of the disk node (DP3) 400, a segment LVOL1-A4 is allocated to the slice S2 of the disk node (DP1) 200, a segment LVOL1-A5 is allocated to the slice S2 of the disk node (DP2) 300, a segment LVOL1-A6 is allocated to the slice S2 of the disk node (DP3) 400, a segment LVOL1-A7 is allocated to the slice S3 of the disk node (DP1) 200, and a segment LVOL1-A8 is allocated to the slice S3 of the disk node (DP2) 300. It is noted that segments are not allocated to the virtual slices S101 to n of the respective disk nodes.

Next, the metadata is described. FIG. 6 is an example of the metadata indicating the state of FIG. 5.

In metadata 5000, a disk node ID 5010 and a slice ID 5020 of slice access information, a data area flag 5030, a logical disk allocation flag 5040, a duplicate slice flag 5050, a logical disk ID 5060 and an initial address 5070 of logical disk information, and a logical disk ID 5080 and an initial address 5090 of duplicate source logical disk information are set.

Discrimination information for discriminating (differentiating or uniquely identifying) the slice is set in the slice access information. The slice is discriminated by the disk node ID 5010 and the slice ID 5020 of the disk node which manages this slice. For example, when the disk node ID is "DP1" and the slice ID is "1", the slice S1 of the disk node (DP1) in FIG. 5 is represented.

In the data area flag 5030, it is set whether or not the slice set in the slice access information has a data area. In a case where the real slice has the data area, "TRUE" is set. In a case where the virtual slice does not have the data area, "FALSE" is set. At this time, when the slice ID is 1 to 100, in the real slice (with the data area), "TRUE" is set. Also, when the slice ID is 101 to n, in the virtual slice (without the data area), "FALSE" is set.

In the logical disk allocation flag 5040, it is set whether or not the logical disk is allocated to the slice set in the slice access information. When the logical disk is allocated, "TRUE" is set. When the logical disk is not allocated, "FALSE" is set. It is noted that the logical disk herein also includes the duplicate logical disk.

In the duplicate slice flag 5050, it is set whether or not the slice set in the slice access information is the duplicate slice where the duplicate source exists. When the slice is the duplicate slice, "TRUE" is set. When the slice is not the duplicate slice, "FALSE" is set. When the segment is not allocated, and the state is undecided, "NULL" is set. It is noted that where the duplicate source exists represents that the data of the allocated segment is not stored in this slice. Therefore, as the slice with the slice ID of 1 to 100 which is the real slice has the data area and stores the data of the segment, "FALSE" is regularly set. Even when the allocated segment is the segment of the duplicate logical disk, the same applies. On the other hand, as the slice with the slice ID of 101 to n which is the virtual slice, "NULL" is set when the segment is not allocated and "TRUE" is set when the segment is allocated. Also, when the duplicate slice flag is "TRUE", the information on the corresponding duplicate source logical disk is registered in the duplicate source logical disk information (the logical disk ID 5080 and the initial address 5090).

In the logical disk information, the logical disk information of the segment (the logical disk ID 5060, the initial address 5070) allocated to the slice which is set in the slice access information is set. When the logical disk allocation flag 5040 is "TRUE", the logical disk ID and the initial address of the relevant logical disk (also including the duplicate logical disk) are registered.

In the duplicate source logical disk information, when the slice set in the slice access information is the duplicate slice, the duplicate source logical disk information (the logical disk ID 5080, the initial address 5090) for discriminating the segment of the corresponding logical disk at the duplication source is set. When the duplicate slice flag 5050 is "TRUE", in the segment of the duplicate logical disk allocated to the slice, the identification information on the segment of the corresponding logical disk at the duplication source is registered.

For example, for the slice where the disk node ID at the first line is "DP1" and the slice ID is "1", the data area flag is "TRUE", the logical disk is "TRUE", and the duplicate slice flag is "FALSE". That is, it is represented that a slice DP1-1 is the real slice, and the segment of the logical disk LVOL1-A1 is allocated. Similarly, it is represented that a slice DP1-2 is the real slice, and the segment of the logical disk LVOL1-A4 is allocated. It is represented that a slice DP1-3 is the real slice, and the segment of the logical disk LVOL1-A7 is allocated. It is represented that a slice DP2-1 is the real slice, and the segment of the logical disk LVOL1-A2 is allocated. It is represented that a slice DP2-2 is the real slice, and the segment of the logical disk LVOL1-A5 is allocated. It is represented that a slice DP2-3 is the real slice, and the segment of the logical disk LVOL1-A8 is allocated. It is represented that a slice DP3-1 is the real slice, and the segment of the logical disk LVOL1-A3 is allocated. Then, it is represented that a slice DP3-2 is the real slice, and the segment of the logical disk LVOL1-A6 is allocated. The other slices all have unallocation.

Hereinafter, a processing procedure for the duplicate logical disk creation in the multi-node storage system of the above-mentioned configuration will be described in detail.

Figure 7:
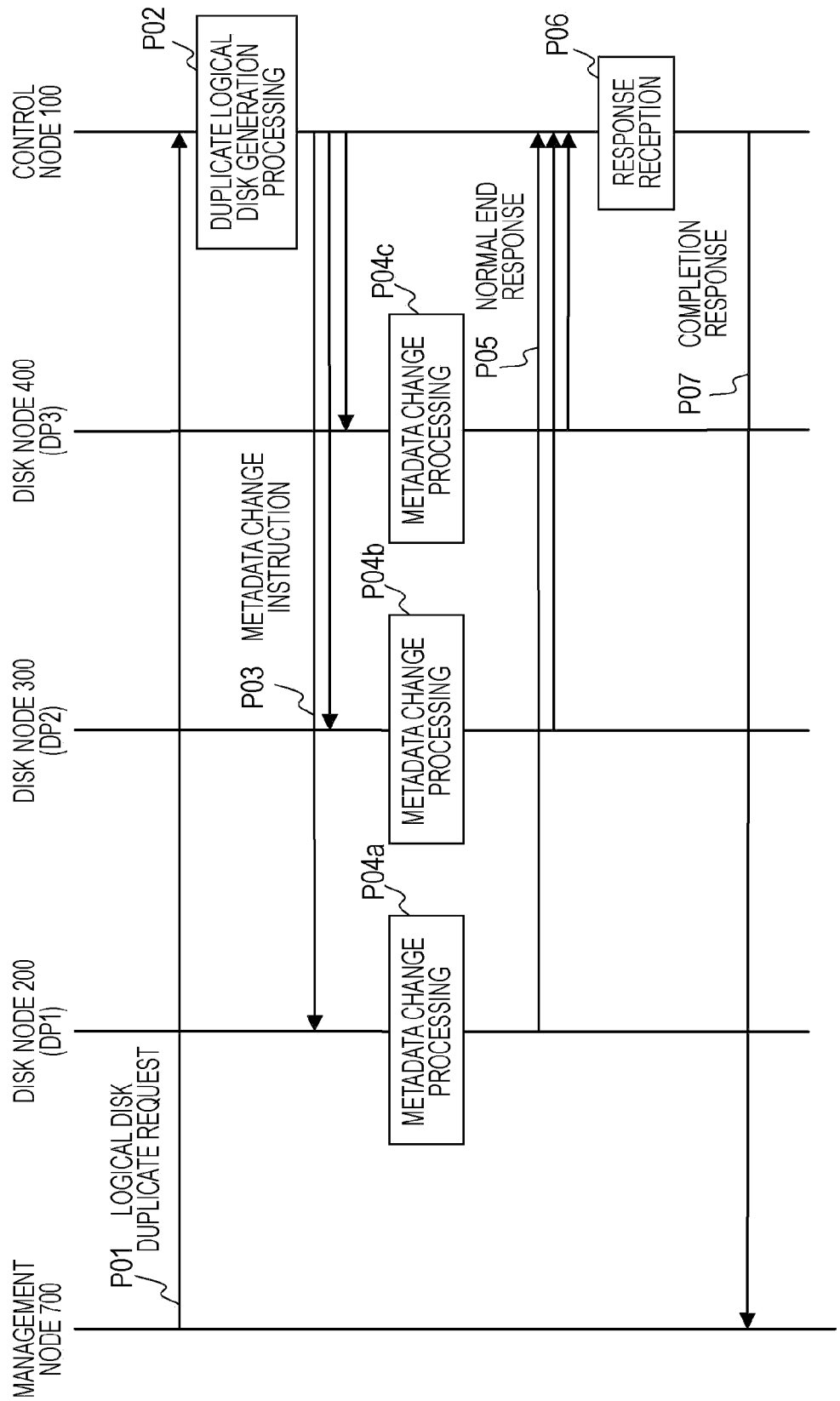
FIG. 7 is a sequence diagram showing a creation processing for a duplicate logical disk.

First, in accordance with a duplicate request from the client, a duplicate logical disk is generated. FIG. 7 is a sequence diagram of the creation processing for the duplicate logical disk.

In response to the request from the client, the management node 700 issues the duplication request of the logical volume to the control node 100 [P01]. The control node 100 obtaining the duplication request of the logical volume performs the duplicate logical disk generation processing [P02]. Hereinafter, the segment of the logical disk is set as the logical segment, and the segment of the duplicate logical disk is set as the duplicate logical segment.

In the duplicate logical disk generation processing, the metadata is analyzed, and the virtual slice (the slice ID is 101 to n) where the segment is unallocated is detected. Then, the detected virtual slice is allocated to the duplicate logical segment to update the metadata. The updated metadata is distributed to the associated disk nodes 200, 300, and 400 together with a change instruction of the metadata [P03].

The respective disk nodes receiving the metadata and the metadata change instruction update the metadata held by itself to the instructed metadata. The disk node (DP1) 200 updates the metadata stored in its own slice through the metadata change processing [P04a] and returns the normal response [P05]. The disk node (DP2) 300 updates the metadata stored in its own slice through the metadata change processing [P04b] and returns the normal response [P05]. Then, the disk node (DP3) 400 also updates the metadata stored in its own slice through the metadata change processing [P04c] and returns the normal response [P05].

The control node 100 receives the normal end responses from the respective disk nodes which instructs the metadata change [P06] returns and the end response to the management node 700 when the normal response are obtained from all the disk nodes [P07].

The above-mentioned processing procedure is executed, and the duplicate logical disk is generated. A state of the disk node after the generation of the duplicate logical disk is described. FIG. 8 is an example of a slice allocation state of the disk node after the duplicate logical disk is generated.

The duplicate logical disk (LVOL2) 1071 which is the duplicate of the logical disk (LVOL1) 1070 adopts a segment configuration similar to the logical disk (LVOL1) 1070.

The slice allocation (DP1) 2001, the slice allocation (DP2) 3001, and the slice allocation (DP3) 4001 show respective states of the disk node (DP1) 200, the disk node (DP2) 300, and the disk node (DP3) 400 after the duplicate logical disk is generated. In the drawing, a changed part from the state shown in FIG. 5 is indicated by a diagonal line.

As shown in the drawing, the segments of the duplicate logical disk (LVOL2) 1071 are allocated to the virtual slices of the respective disk nodes. For example, a duplicate logical segment LVOL2-A1 is allocated to a slice DP1-101 of the disk node (DP1) 200. Similarly, a duplicate logical segment LVOL2-A2 is allocated to a slice DP1-102, a duplicate logical segment LVOL2-A3 is allocated to a slice DP1-103, a duplicate logical segment LVOL2-A4 is allocated to a slice DP2-101, a segment LVOL2-A5 is allocated to a slice DP2-102, a duplicate logical segment LVOL2-A6 is allocated to a slice DP2-103, a duplicate logical segment LVOL2-A7 is allocated to a slice DP3-101, and a duplicate logical segment LVOL2-A8 is allocated to a slice DP3-102. It is noted that the slice allocation of the logical disk (LVOL1) 1070 is not changed.

Next, the metadata at this time is described. FIG. 9 is an example of the metadata representing a state of FIG. 8.

Metadata 5001 of FIG. 9 represents a state in which the metadata 5000 shown in FIG. 6 is updated by the duplicate logical disk generation processing (P02). The respective items are similar to the metadata 5000.

The metadata of the updated virtual slice is described.

Metadata 5001a of the virtual slice of the disk node (DP1) 200 (the slice ID=101) is updated so that the logical disk allocation flag is "TRUE", the duplicate slice flag is "TRUE", the logical disk ID of the logical disk information is "LVOL2" and the initial address is "A1", and the logical disk ID of the duplicate source logical disk information is "LVOL1" and the initial address is "A1". This represents that the duplicate logical segment LVOL2-A1 is allocated to the virtual slice DP1-101, and the duplication source is the logical segment LVOL1-A1. It is represented that the duplicate logical segment LVOL2-A2 is allocated to the next virtual slice DP1-102, and the duplication source is the logical segment LVOL1-A2. It is represented that the duplicate logical segment LVOL2-A3 is allocated to the next virtual slice DP1-103, and the duplication source is the logical segment LVOL1-A3.

Regarding the disk node (DP1) 200, the updated metadata is newly sent to the disk node (DP1) 200 through the metadata change instruction [P03]. In this manner, the metadata change instruction from the control node 100 to the respective disk nodes is performed by only extracting the updated part. The disk node (DP1) 200 writes the received metadata in the relevant slice area. At this time, the metadata storage area of the virtual slice of the disk node (DP1) 200 (ID=101, 102, 103) is updated.

Metadata 5001b of the virtual slice of the disk node (DP2) 300 (the slice ID=101) is updated so that the logical disk allocation flag is "TRUE", the duplicate slice flag is "TRUE", the logical disk ID of the logical disk information is "LVOL2" and the initial address is "A4", and the logical disk ID of the duplicate source logical disk information is "LVOL1" and the initial address is "A4". This represents that the duplicate logical segment LVOL2-A4 is allocated to the virtual slice DP2-101, and the duplication source is the logical segment LVOL1-A4. It is represented that the duplicate logical segment LVOL2-A5 is allocated to the next virtual slice DP2-102, and the duplication source is the logical segment LVOL1-A5. It is represented that the duplicate logical segment LVOL2-A6 is allocated to the next virtual slice DP2-103, and the duplication source is the logical segment LVOL1-A6.

Furthermore, metadata 5001c of the virtual slice (the slice ID=101) of the disk node (DP3) 400 is updated so that the logical disk allocation flag is "TRUE", the duplicate slice flag is "TRUE", the logical disk ID of the logical disk information is "LVOL2" and the initial address is "A7", and the logical disk ID of the duplicate source logical disk information is "LVOL1" and the initial address is "A7". This represents that the duplicate logical segment LVOL2-A7 is allocated to the virtual slice DP3-101, and the duplication source is the logical segment LVOL1-A7. It is represented that the duplicate logical segment LVOL2-A8 is allocated to the next virtual slice DP3-102, and the duplication source is the logical segment LVOL1-A8.

Next, a processing procedure at the time where a data read request occurs in this state is described. At this time, as a data read out destination, it is supposed that a segment (LVOL2-A2) of the duplicate logical disk (LVOL2) is specified.

FIG. 10 is a sequence diagram showing a read processing of the duplicate logical disk.

A read request for reading out the data the duplicate logical segment LVOL2-A2 is sent from the access node 500 to the disk node 200 [P11]. The access node 500 has the metadata, and the logical disk information of the metadata 5001 shown in FIG. 9 is searched for to detect the relevant duplicate logical segment LVOL2-A2. Then, on the basis of the slice access information corresponding to the detected duplicate logical segment LVOL2-A2, the disk node at the read out destination and the slice ID are identified. At this time, the virtual slice DP1-102 of the disk node (DP1) 200 is identified. Thus, the read request (LVOL2-A2) is sent to the disk node (DP1) 200.

The disk node (DP1) 200 receiving the read request (LVOL2-A2) checks the metadata of the corresponding slice DP1-102 and determines whether this slice is the real slice or the virtual slice [P12]. The data area flag of the metadata of the slice DP1-102 is read to determine whether the slice is the real slice (TRUE) or the virtual slice (FALSE). At this time, as the slice is the virtual slice (FALSE), the corresponding duplicate source logical disk information is read from the metadata to perform the metadata inquiry [P13]. In the example of the drawing, as the duplication source disk information, the logical segment LVOL1-A2 is extracted to be sent together with the metadata inquiry asking to the control node 100. In the control node 100, the metadata inquiry unit 130 performs the metadata inquiry processing to extract the metadata corresponding to the logical segment LVOL1-A2 [P14]. Through the metadata inquiry processing, the logical disk information of the metadata 5001 shown in FIG. 9 is searched for, and an inquiry is made on the relevant segment LVOL1-A2. Then, the metadata related to the logical segment LVOL1-A2 is extracted, and this is returned to the disk node (DP1) 200 [P15]. It is noted that the metadata to be sent does not need to include all the items and may suffice if at least the slice access information for identifying the slice storing the data of the segment is included. In this case, the slice DP2-1 of the disk node (DP2) 300 extracted from the slice access information is sent.

The disk node (DP1) 200 receiving the metadata can identify the slice DP2-1 of the disk node (DP2) 300 where the data of the duplication source segment is stored from the metadata. In view of the above, the read transfer unit 230 starts the read transfer processing [P16], and on the basis of the metadata, the read request of the slice DP2-1 is performed with respect to the disk node (DP2) 300 storing the data of the logical segment LVOL1-A2 [P17]. The disk node (DP2) 300 receiving the read request reads out the data from the data area of the relevant slice DP2-1 to be sent to the disk node 200 [P18]. With this configuration, the data is sent to the disk node (DP1) 200 [P19].

The disk node (DP2) 200 obtains the data of the logical segment LVOL1-A2 which is the duplication source of the duplicate logical segment LVOL2-A2 of the requested duplicate logical disk LVOL2, and transfers this data to the access node 500 [P20]. Thus, the data at the duplication source is sent to the access node 500 [P21], and the read processing is ended.

According to the above-mentioned processing procedure, with respect to the read request to the duplicate logical disk, the slice storing the data of the logical disk at the duplication source corresponding to the read request destination is detected, and the data read out from this slice is transferred as the read data. In this manner, the data in which the duplicate logical disk is not updated is shared with the duplication source, and therefore the configuration is not redundant.

It is noted that the metadata inquiry to the control node 100 [P13] does not need to be performed again as long as the duplication source slice is not changed once the metadata inquiry is performed with respect to the target slice. In view of the above, the metadata obtained through the metadata inquiry to the control node 100 [P13] or the slice access information at the duplication source is accumulated in the storage module as the duplication source slice information, which may be utilized. Details thereof will be described below.

Figure 11:
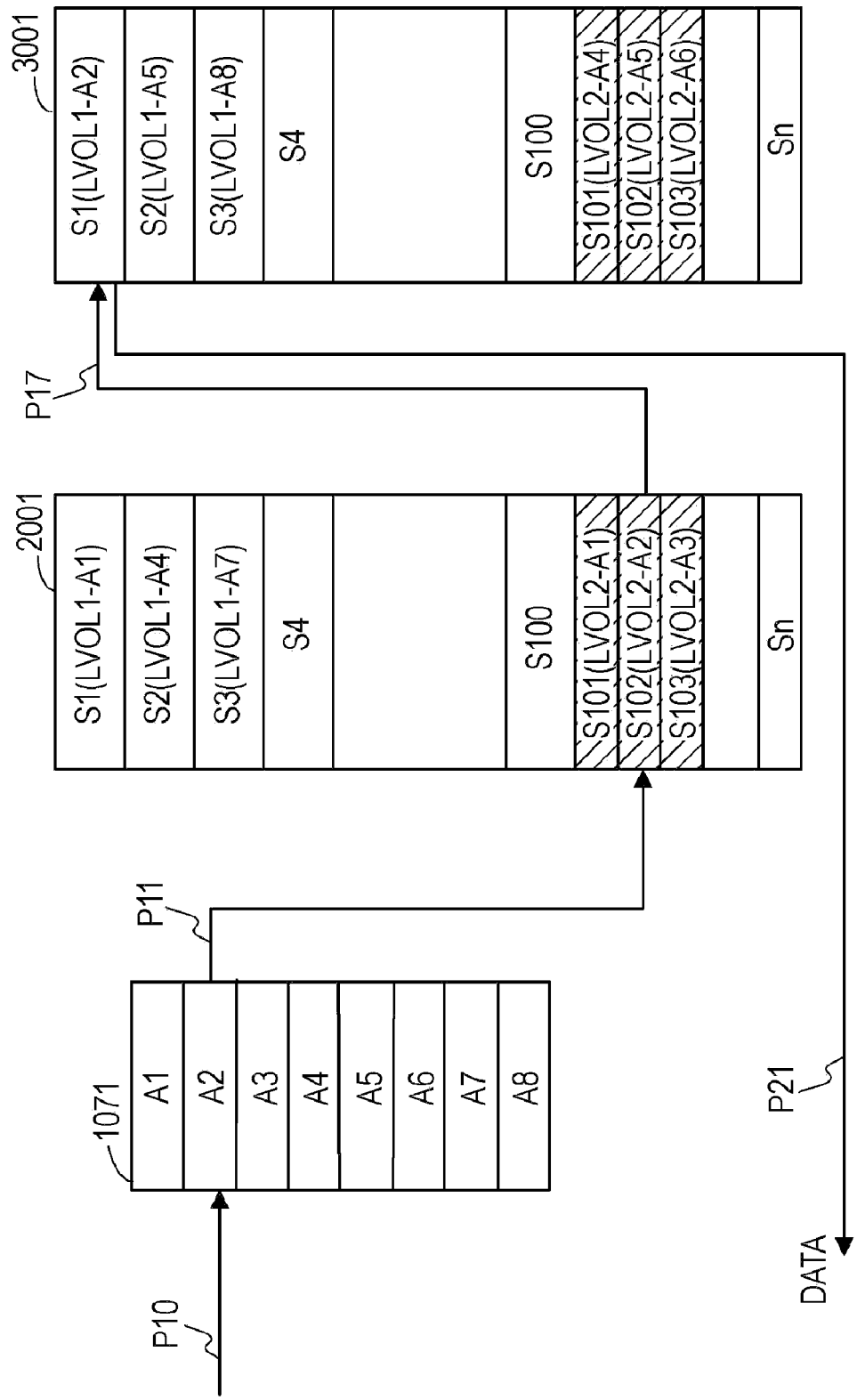
FIG. 11 is data areas accessed in respective processings in FIG. 10.

The disk area of the disk accessed through the respective processings in the sequence diagram of FIG. 10 is described. FIG. 11 is the data area accessed through the respective processings in FIG. 10. The same parts as those in FIG. 10 are denoted by the same numerals, and a description thereof will be omitted.

From the terminal apparatus 801 or the like, a read request for setting the duplicate logical segment LVOL2-A2 of the duplicate logical disk (LVOL2) 1071 as an access destination is issued [P10]. On the basis of the metadata held by itself, the access node 500 detects that the slice allocated to the duplicate logical segment LVOL2-A2 at the read request destination is the slice DP1-102 of the disk node (DP1) 200. In view of the above, a read request for setting the slice DP1-102 as an access destination is output [P11].

The disk node (DP1) 200 receiving the read request detects that the slice DP1-102 is the virtual slice on the basis of the metadata held by itself and identifies the logical segment at the duplication source. Then, the metadata inquiry is performed with respect to the control node 100, and the metadata related to the logical segment LVOL1-A2 at the duplication source is obtained.

Subsequently, on the basis of the obtained metadata, the slice DP2-1 at the duplication source storing the data of the logical segment LVOL1-A2 at the duplication source is identified. With respect to the disk node (DP2) 300 for managing the slice DP2-1 at this duplication source, a read request is performed [P17]. Then, the obtained data is transferred to the access node 500 [P21].

In this manner, when the read request with respect to the virtual slice occurs, the duplication source slice storing the data at the duplication source is identified, and the data read out is performed from the duplication source slice.

FIG. 12 is an example of duplication source slice information.

The duplication source slice information 6000 is composed of slice access information 6001 and logical disk information 6002 extracted from the metadata which is obtained from the control node 100 through the metadata inquiry [P13]. In the slice access information 6001, the disk node ID and the slice ID for identifying the slice storing the data of the segment of the duplication source logical disk are stored. Also, the logical disk information 6002 stores the logical disk ID and the initial address for identifying the segment of the duplication source logical disk.

In the metadata inquiry [P13], through the control node 100, the metadata is extracted in which the segment set in the duplicate source logical disk information in the metadata of the virtual slice where the read request occurs is set in the logical disk information. In the slice access information of the metadata thus extracted, the discrimination information on the slice storing the data of the segment of the duplication source logical disk is set.

Each time the metadata is obtained from the metadata inquiry [P13], the slice access information 6001 and the logical disk information 6002 are extracted from the obtained metadata and stored. Also, when a metadata error occurs in the read transfer processing performed on the basis of the registration of the slice access information 6001, it is determined that this slice access information is not matched with the current situation, and the information is deleted.

Figure 13:
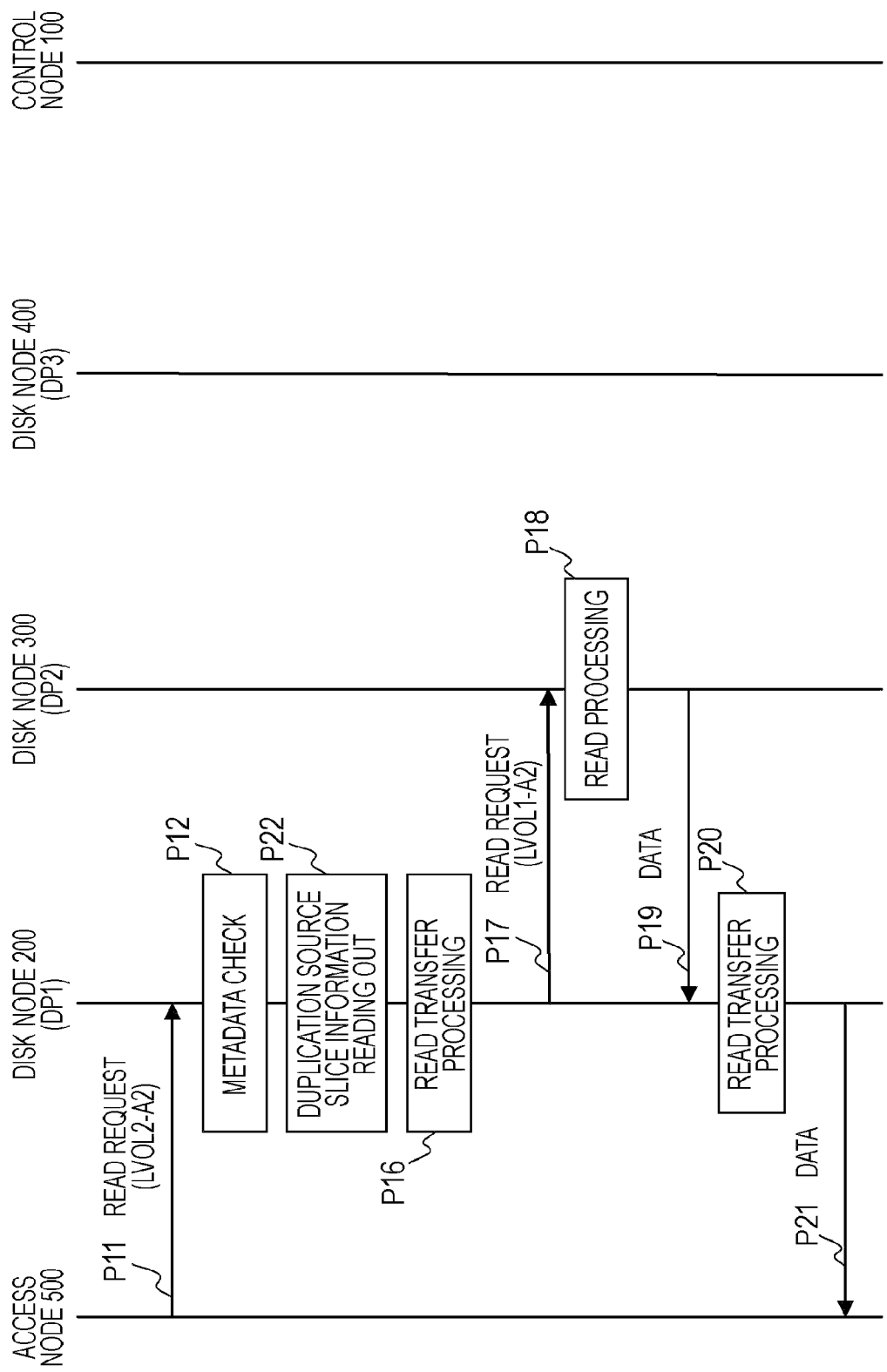
FIG. 13 is a sequence diagram showing a read processing using duplication source slice information.

Next, a processing procedure of the read request by using the duplication source slice information is described. FIG. 13 is a sequence diagram showing a read processing by using the duplication source slice information. The same processing as that of FIG. 10 is denoted by the same numeral, and a description thereof will be omitted.

Similarly as in the read request procedure shown in FIG. 10, after the read request (LVOL2-A2) is received [P11], it is determined whether the slice storing the data of the segment where the read request occurs through the metadata check is the virtual slice or the real slice [P12]. At this time, on the basis of the metadata, it is supposed that the segment LVOL2-A2 where the read request occurs is the virtual slice. Subsequently, it is investigated that the slice access information at the duplication source corresponding to this virtual slice exists in the duplication source slice information 6000, and when the slice access information exists, this information is read out [P22]. The logical disk information of the duplication source slice information 6000 shown in FIG. 12 is collated with the duplicate source logical disk information of the metadata of the relevant slice extracted through the metadata check, and the matched one is detected. When matched, the slice specified by this slice access information is set as the slice at the duplication source. When not matched, the metadata inquiry and the subsequent processings [P13] shown in FIG. 10 are performed.

In the example of FIG. 13, the relevant slice access information exists in the duplication source slice information 6000, and on the basis of this slice access information, the read transfer processing is performed [P16]. The read transfer processing and the subsequent processings are similar to those of FIG. 10, and a description thereof will be omitted.

In this manner, the inquired metadata is stored as the duplication source slice information, and by referring to the metadata in the next and subsequent read request processing, labor hour for the metadata inquiry is omitted, and the processing time can be shortened.

However, the inquired metadata may be updated by the control node 100. In this case, if the read transfer processing is performed on the basis of the metadata before the update, the data cannot be read out, and an error occurs. A processing procedure in such a case is described.

Figure 14:
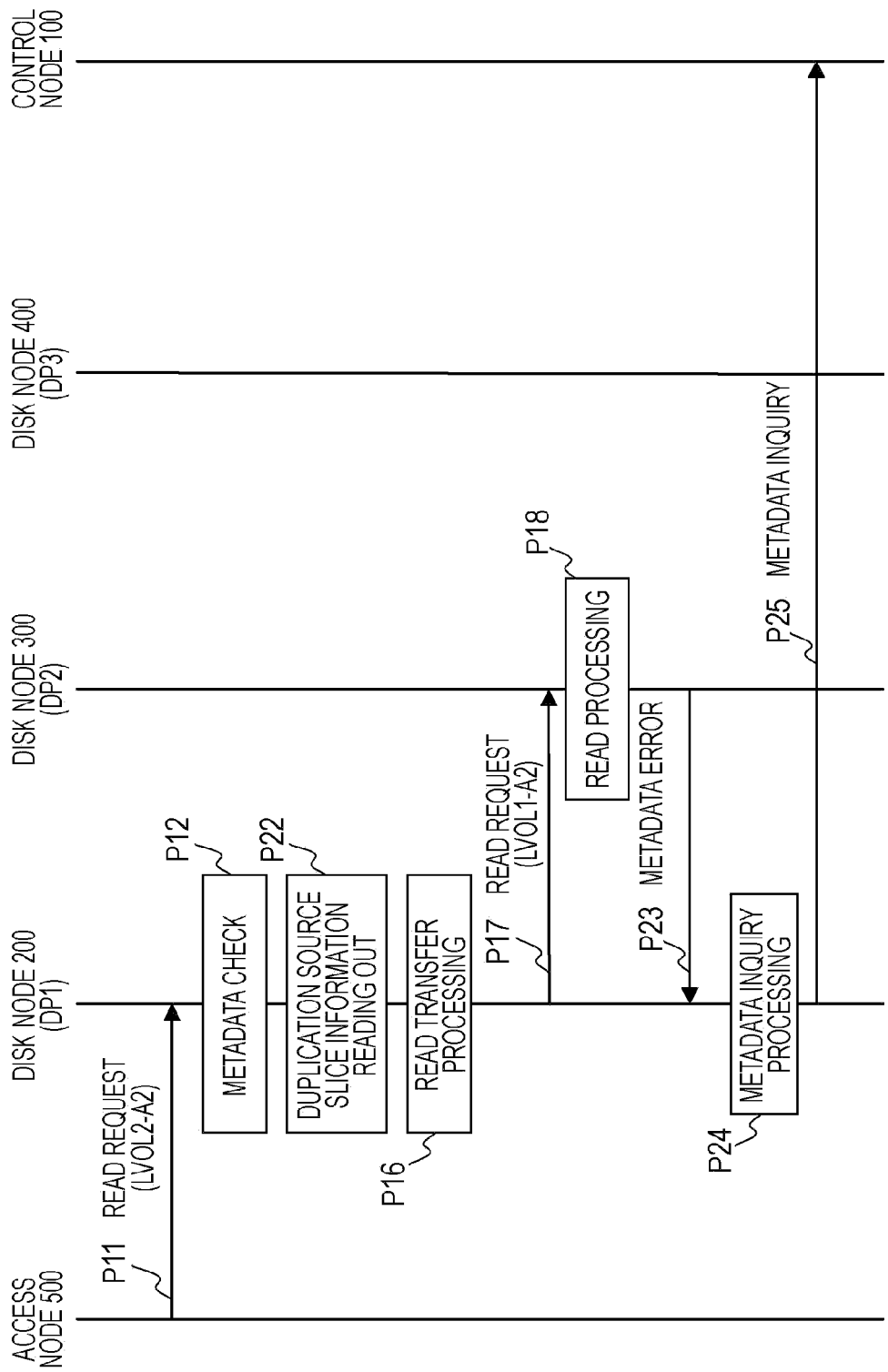
FIG. 14 is a procedure of a read request processing in a case where metadata related to a duplication source slice is updated.

FIG. 14 is a diagram showing a read request processing in a case where the metadata related to the slice at the duplication source is updated. The same parts as those of FIGS. 10 and 13 are denoted by the same numerals, and a description thereof will be omitted.

At this time, similarly as in the procedure of FIG. 13, on the basis of the slice access information of the duplication source slice information 6000 read out through the duplication source slice information reading [P22], the read transfer processing is performed [P16]. However, the duplication source slice information is information before the control node 100 updates the slice allocation related to the disk node (DP2) 300. For this reason, in the read processing by the disk node (DP2) 300, a metadata error is detected [P18], and a response to the metadata error is returned to the disk node (DP1) 200 [P23]. As the disk node (DP1) receives the metadata error, it is detected that the metadata is updated. In view of the above, the metadata inquiry to the control node 100 is performed [P24], and the metadata inquiry asking based on the duplicate source logical disk information is sent [P25]. The processing after the metadata inquiry is similar to that of FIG. 10, and a description will be thus omitted.

In this manner, the content of the duplication source slice information is not matched with the current situation, and when the read request fails, an inquiry asking of the metadata is performed again. Then, it is possible to perform the read transfer processing on the basis of the inquired metadata.

It is noted that in the read request processing, the allocation of the virtual slice with respect to the duplicate logical disk is not updated. The virtual slice does not have the data area but identifies the duplication source slice storing the duplication source segment data and transfers the data. Thus, the virtual slice can function similarly as in the case of being provided with the data area.

Next, a processing at a time when the write request is received is described. At this time, as a data writing destination, it is supposed that the duplicate logical segment LVOL2-A2 of the duplicate logical disk (LVOL2) is specified.

Figure 15:
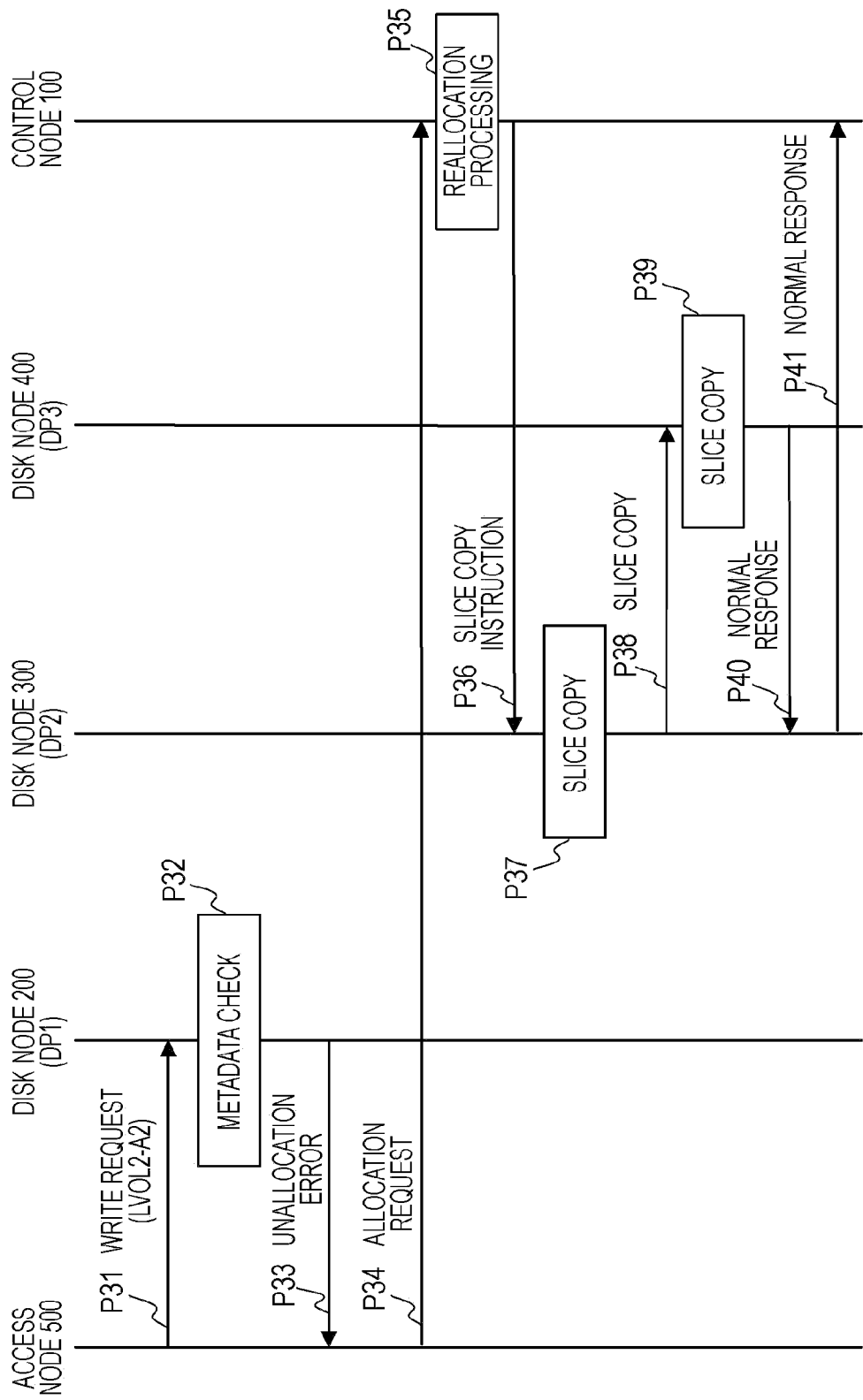
FIG. 15 is a sequence diagram showing a write processing of a duplicate logical disk.

FIG. 15 is a sequence diagram showing a write processing of the duplicate logical disk.

The data write request (LVOL2-A2) is sent from the access node 500 to the disk node (DP1) 200 (P31). The access node 500 searches for the logical disk information of the metadata 5001 shown in FIG. 9 to detect the duplicate logical segment LVOL2-A2 as the access destination of the write request. Then, on the basis of the slice access information corresponding to the detected duplicate logical segment LVOL2-A2, the disk node (DP1) 200 at the writing destination and the slice DP1-102 are identified. Thus, the write request is sent from the access node 500 to the disk node (DP1) 200 [P31].

The disk node (DP1) 200 receiving the write request (LVOL2-A2) checks the metadata related to the slice DP1-102 specified by the write request and determines whether this slice is the real slice or the virtual slice [P32]. The data area flag of the metadata with the slice ID of 102 is read out to determine whether the slice is the real slice (TRUE) or the virtual slice (FALSE). At this time, as the slice is the virtual slice (FALSE), the unallocation error is returned to the access node 500 [P33].

The access node 500 obtaining the unallocation error from the disk node (DP1) 200 performs an allocation request to the control node 100 so that this segment is allocated to the real slice [P34].

The control node 100 obtaining the allocation request from the access node 500 [P34] performs a reallocation processing for reallocating the corresponding segment to the real slice [P35]. In the allocation processing of the control node 100, the metadata is searched for, and the real slice which is not yet allocated to the segment is detected. Then, the detected real slice is allocated to the segment to be set as the duplication destination slice. At this time, it is supposed that a real slice DP3-3 of the disk node (DP3) 400 is detected. Similarly, on the basis of the metadata 5001, the duplication source slice holding the data of the logical segment at the duplication source is identified. From the metadata 5001, on the basis of the duplicate source logical disk information of the duplicate logical segment LVOL2-A2 where the unallocation error is generated, the segment at the duplication source is identified. At this time, the logical segment LVOL1-A2 is identified. Furthermore, the metadata where the logical segment LVOL1-A2 is registered in the logical disk information is searched for, and the slice access information thereof is extracted. At this time, the slice DP2-1 is identified. Thus, the duplication source slice DP2-1 and the duplication destination slice DP3-3 are identified, and a slice copy instruction is output to the disk node (DP2) 300 for managing the duplication source slice DP2-1 [P36].

The disk node (DP2) 300 receiving slice copy instruction sequentially reads out the data of the duplication source slice DP2-1 and performs a slice copy processing for the copy to the duplication destination slice DP3-3 of the disk node (DP3) 400 [P37]. With this configuration, the data of the slice copy is sent from the disk node (DP2) 300 to the disk node (DP3) 400 [P38]. The disk node (DP3) 400 for managing the duplication destination slice DP3-3 which receives the slice copy data performs a slice copy processing of writing this data to the duplication destination slice DP3-3 [P39]. Then, after the slice copy processing, the normal response is returned to the disk node (DP2) 300 [P40]. The disk node (DP2) 300 checks the completion of the data normal writing to the duplication destination slice and returns the normal response to the control node 100 [P41].

Figure 16:
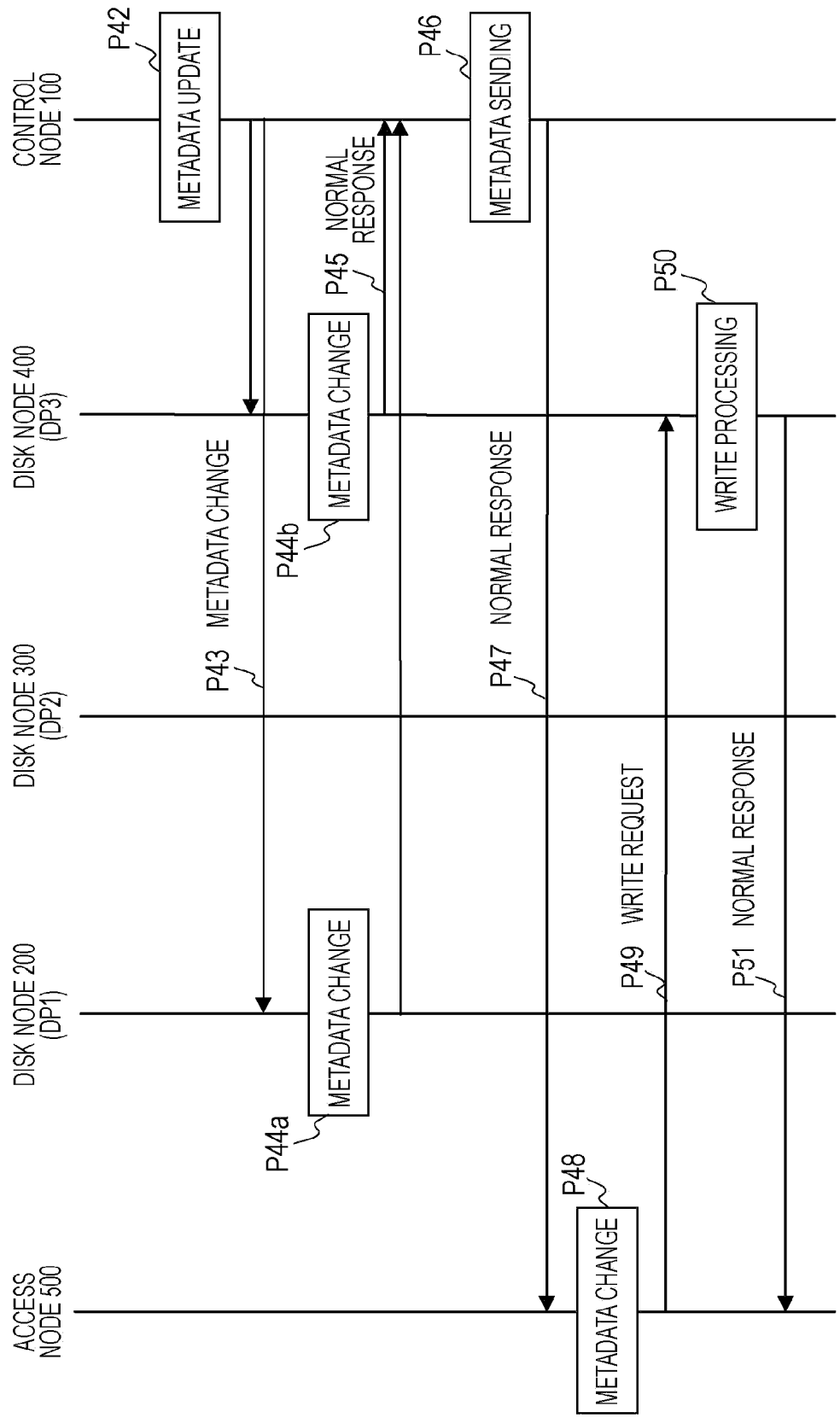
FIG. 16 is a sequence diagram showing a write processing of a duplicate logical disk after an end of reallocation.

Subsequently, a processing after the end of the reallocation is described. FIG. 16 is a sequence diagram showing a write processing of the duplicate logical disk after the end of the reallocation.

After the reallocation is ended and the slice copy from the duplication source slice DP2-1 to the duplication destination slice DP3-3 is normally ended, the control node 100 updates the metadata in accordance with the state after the reallocation [P42]. At this time, the metadata of the real slice DP3-3 allocated to the duplicate logical segment LVOL2-A2 through the reallocation and the metadata of the virtual slice DP2-102 which has been allocated to the duplicate logical segment LVOL2-A2 before the reallocation are updated. Through the reallocation, in the allocated real slice DP3-3, the logical disk allocation flag is set as "TRUE", the duplicate slice flag is set as "TRUE", the logical disk information is set as "LVOL2-A2", and the duplicate source logical disk information is set as "LVOL1". Also, the allocation of the virtual slice DP2-102 originally allocated is cancelled. The logical disk allocation flag of the metadata of the virtual slice DP2-102 is set as "NULL", and associated information items are reset. Then, the updated metadata is sent to the disk node (DP1) 200 and the disk node (DP3) 400, respectively, to perform the metadata change asking [P43].

The disk node (DP1) 200 receiving the metadata change asking executes the metadata change processing [P44a] and the disk node (DP3) 400 executes the metadata change processing [P44b], respectively, to update the metadata. After that, the normal response [P45] is returned to the control node 100. When the slice copy is normally ended, the control node 100 sends the metadata to the access node 500 [P46], the normal response for notifying that the reallocation is normally ended is returned [P47]. The access node 500 receives the normal response and changes the metadata stored in its own apparatus to the received metadata [P48]. After that, the access destination is set as the reallocated real slice DP3-3, and the write processing can be performed.

The access node 500 performs the write request again to the disk node (DP3) 400 for managing the reallocated slice DP3-3 [P49]. The disk node (DP3) 400 performs the write processing on the basis of the obtained write request [P50] and returns the normal response to the access node 500 [P51].

Figure 17:
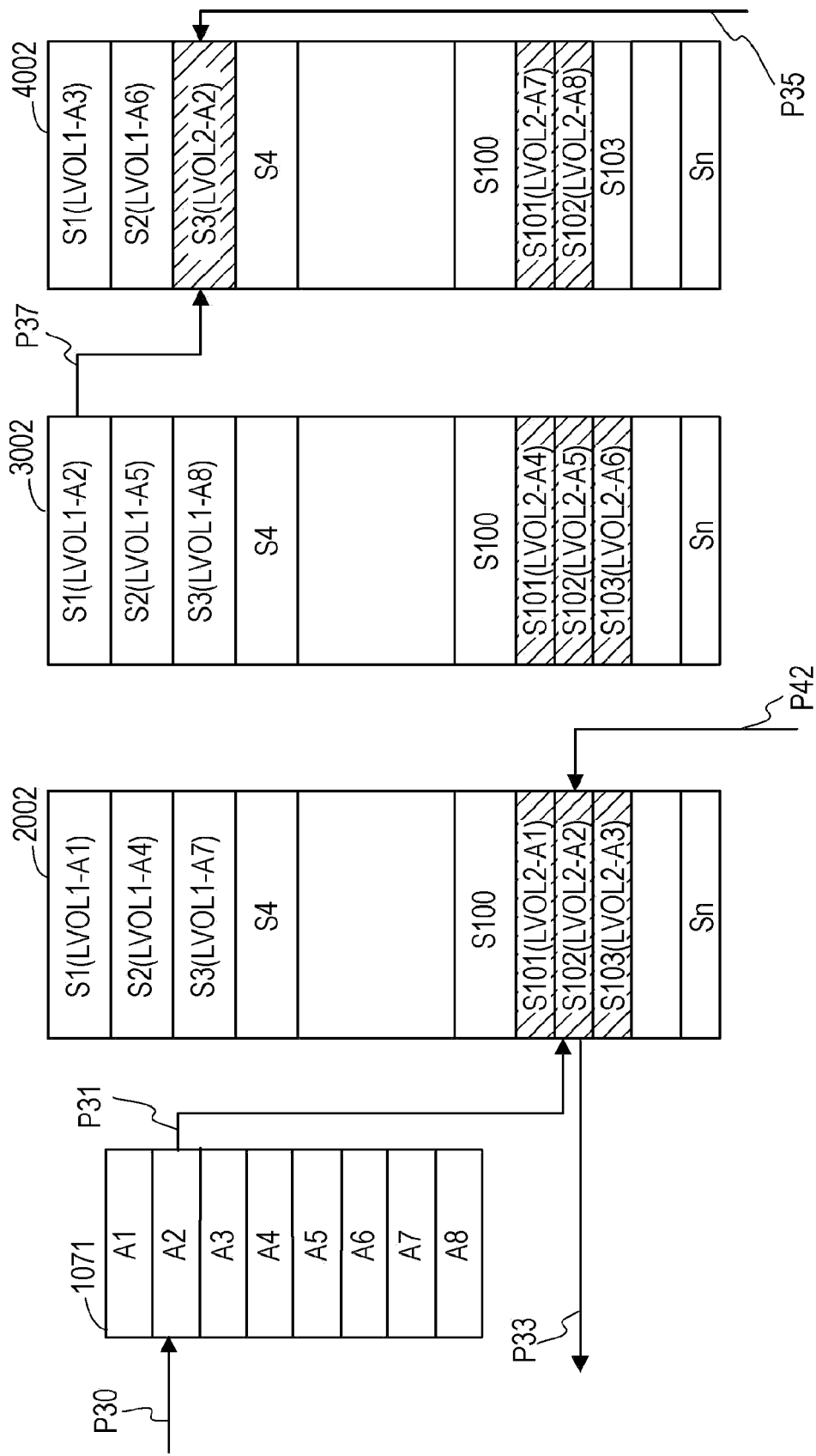
FIG. 17 is data areas accessed in respective processings in FIGS. 15 and 16.

The data area of the disk accessed through the respective processings of the sequence diagrams of FIGS. 15 and 16 is described. FIG. 17 is the data area accessed through the respective processings in FIGS. 15 and 16. The same parts as those in FIGS. 15 and 16 are denoted by the same numerals and a description thereof will be omitted.

The slice allocation (DP1) 2002, the slice allocation (DP2) 3002, and the slice allocation (DP3) 4002 are slice states managed by the disk node (DP1) 200, the disk node (DP2) 300, and the disk node (DP3) 400 after the slice is reallocated.

From the terminal apparatus 801 or the like, the write request is issued to the duplicate logical segment LVOL2-A2 of the duplicate logical disk 1071 [P30]. On the basis of the metadata held by itself, the access node 500 detects that the slice allocated to the logical segment LVOL2-A2 is the slice DP1-102 managed by the disk node (DP1) 200. In view of the above, the write request in which the slice DP1-102 is set as the access destination is sent to the disk node (DP1) 200 for managing the slice DP1-102 [P31].

The disk node (DP1) 200 receiving the write request detects that the requested slice DP1-102 is the virtual slice on the basis of the metadata held by itself, and the unallocation error is returned to the access node 500 [P33].

The access node 500 receiving the unallocation error asks the control node 100 for the slice allocation. Through the reallocation processing of the control node 100, the segment is reallocated to the slice DP3-3 which is the real slice [P35]. Then, the slice copy is performed from the duplication source slice DP2-1 storing the data of the logical segment at the duplication source to the duplication destination slice DP3-3 reallocated to the duplicate logical segment LVOL2-A2 [P37]. After that, the allocation of the original virtual slice DP1-102 which has been allocated to the duplicate logical segment LVOL2-A2 is cancelled [P42].

In this manner, at a time point when the write request occurs to the segment where the virtual slice is allocated, the reallocation to the real slice is newly performed, and the data at the duplication source is copied to the reallocated real slice. With this configuration, it is possible to omit the copy processing at the time of the generation of the duplicate logical disk. Also, the virtual slice is allocated to the unnecessary (non-updated) segment, and the data copy is not generated, so that adoption of the redundant configuration can be prevented.

Figure 18:
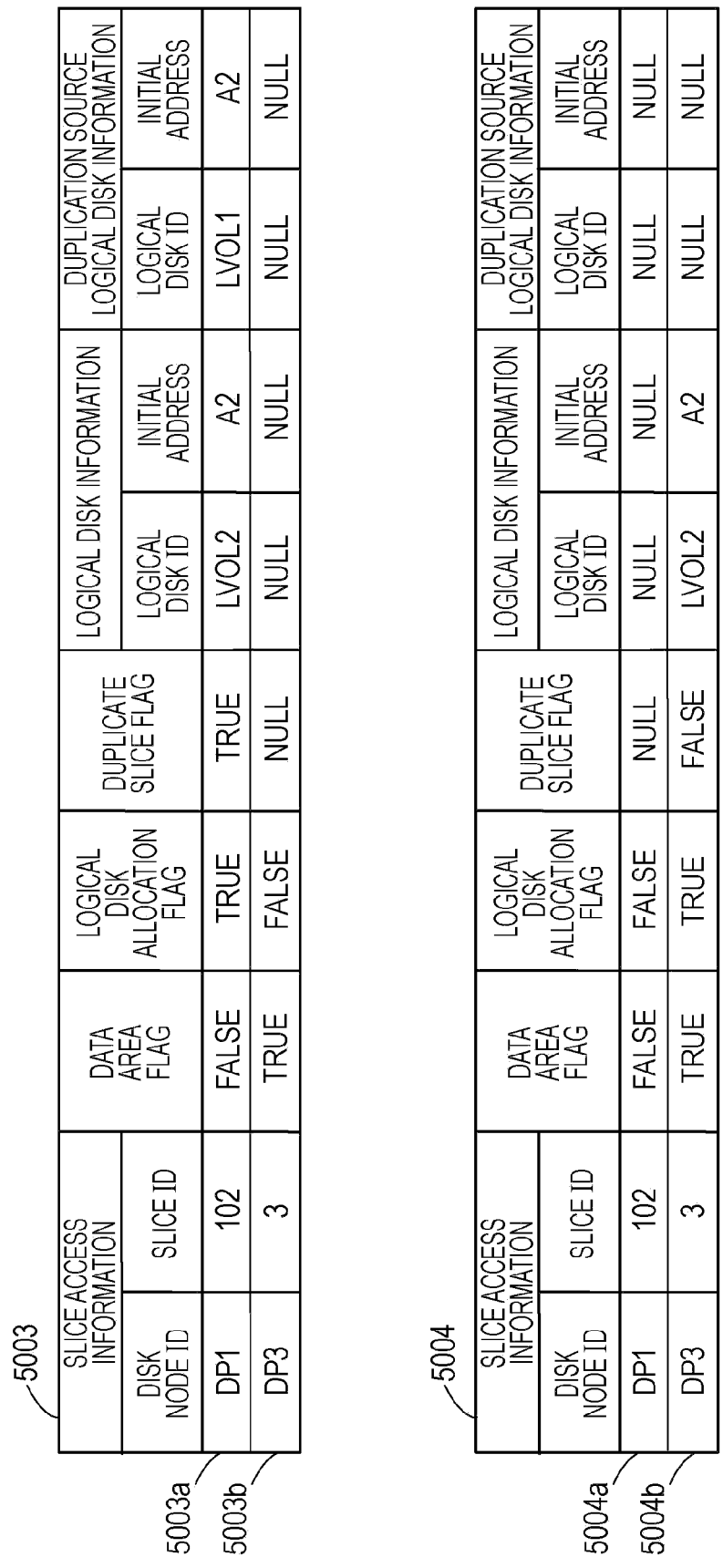
FIG. 18 is metadata before and after a reallocation processing.

Herein, the metadata updated through the reallocation processing is described. FIG. 18 is metadata before and after the reallocation processing.

Metadata 5003 before the real slice allocation is metadata before the reallocation processing. Also, metadata 5004 after the real slice allocation is metadata after the reallocation processing.

The metadata 5003 before the real slice allocation is obtained by extracting the virtual slice firstly allocated to the duplicate logical segment and the metadata of the allocated real slice after the reallocation from the metadata 5001 from at the time of the generation of the duplicate logical disk. Metadata 5003a is metadata of the virtual slice DP1-102 allocated to the duplicate logical segment LVOL2-A2 when the duplicate logical disk LVOL2-A2 is generated. Metadata 5003b is metadata of the real slice DP3-3 to which the segment is not allocated before the reallocation.

In the metadata 5003a of the virtual slice DP1-102, the data area flag is set as "FALSE", the logical disk allocation flag is set as "TRUE", the duplicate slice flag is set as "TRUE", the logical disk information is set as "LVOL2, A2", and the duplicate source logical disk information is set as "LVOL1, A2". This represents that the virtual slice DP1-102 does not have the data area and is allocated to the logical segment LVOL2-A2. Also, it is set that the logical segment LVOL2-A2 is a duplicate of the logical segment LVOL1-A2. In the metadata 5003b of the real slice DP3-3, the data area flag is "TRUE", and the logical disk flag is "FALSE". This represents that the real slice DP3-3 has the data area, and at this time point, the logical segment is not allocated.

In this state, the reallocation processing is performed, and the slice allocated to the duplicate logical segment LVOL2-A2 is changed from the virtual slice DP1-102 to the real slice DP3-3.

The metadata 5004 after the real slice allocation is data obtained by extracting metadata 5004a of the virtual slice DP1-102 and metadata 5004b of the real slice DP3-3 from the metadata after the reallocation processing. In the metadata 5004a of the virtual slice DP1-102 where the allocation is cancelled, the logical disk allocation flag is updated to "FALSE" and represents this is unallocated. In the metadata 5004b of the real slice DP3-3, the data area flag is set as "TRUE", the logical disk flag is set as "TRUE", the duplicate slice flag is set as "FALSE", the logical disk information is set as "LVOL2, A2", and the duplicate source logical disk information is set as "NULL, NULL". This represents that the real slice DP3-3 is allocated to the duplicate logical segment LVOL2-A2. It is noted that at the time of the reallocation processing, the data of the slice DP2-1 corresponding to the logical segment LVOL1-A2 at the duplication source is copied to the real slice DP3-3 and thereafter updated. For this reason, at the time of the subsequent read request, instead of the data of the logical segment LVOL1-A2 at the duplication source, the data of the duplicate logical segment LVOL2-A2 is read out. Therefore, "NULL" is registered in the duplicate slice flag and the duplicate source logical disk information.

The reallocation processing to the real slice is performed as described above, and the metadata 5003 before the real slice allocation is updated to the metadata 5004 after the real slice allocation. This updated metadata is sent to the access node 500 as shown in FIG. 16.

Figure 19:
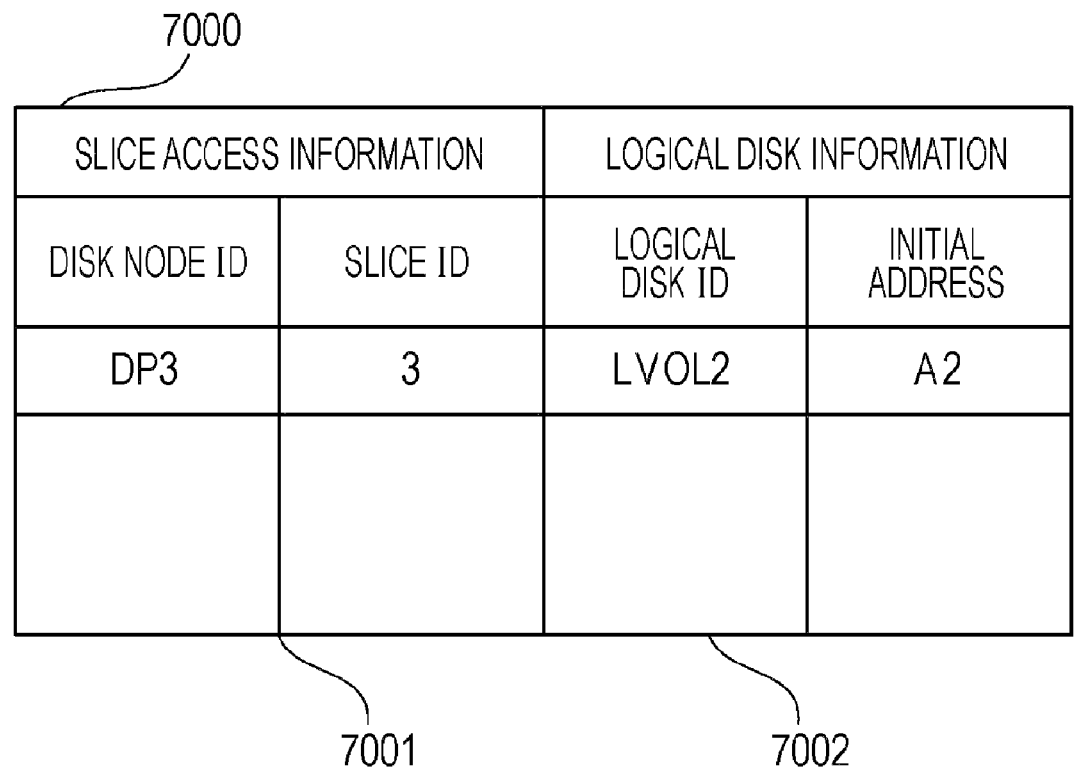

FIG. 19 is an example of the metadata to be sent to the access node after the reallocation.

The access node 500 identifies the slice allocated to this logical segment as the access destination of the specified logical segment and performs an access request with respect to the identified slice. In view of the above, when the allocation destination is changed, the updated metadata is sent to the access node 500.

Sending metadata 7000 to be sent to the access node 500 includes slice access information 7001 for identifying the slice newly allocated to the logical segment and logical disk information 7002 for identifying this logical segment. This is obtained by extracting the slice access information and the logical disk information of the metadata 5004*b* related to the real slice (DP3-3) to which the segment is newly allocated from the metadata 5004 after the real slice allocation.

In this manner, when the write request occurs, the segment allocated to the virtual slice is reallocated to the real slice, and the data storing the slice at the duplication source is copied to the data area of the reallocated real slice. That is, until a need is generated to actually update the data, the virtual slice is allocated to the duplicate logical segment.

Next, a processing procedure of an allocation control method for the duplicate logical disk executed by the control node 100 and the disk nodes 200, 300, and 400 will be described by using a flow chart.

Figure 20:
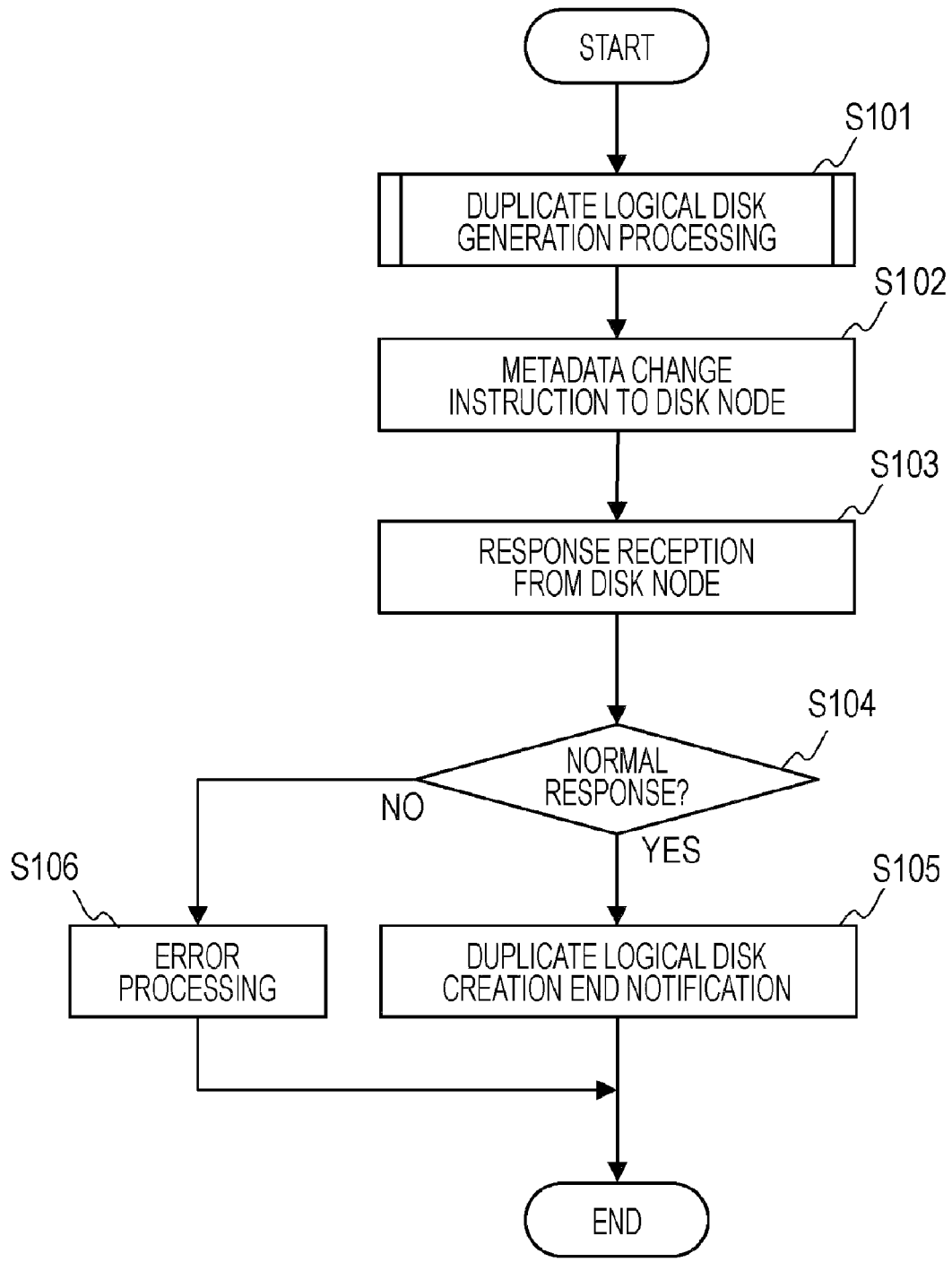
FIG. 20 is a flow chart showing a procedure of a creating processing for a duplicate logical disk of a control node.

FIG. 20 is a flow chart showing a procedure of a creation processing for the duplicate logical disk of the control node. A creation request of the duplicate logical disk is obtained from the management node 700, and the processing is started. It is noted that a processing in brackets in the following description is a processing executed by the disk nodes 200, 300, and 400.

[Operation S101] The duplicate logical disk generation processing is carried out. In the duplicate logical disk generation processing, the segments of the duplicate logical disk are allocated to the virtual slices of the disk nodes 200, 300, and 400. Then, as to the virtual slice allocated to the segment, metadata including logical disk information thereof and duplicate source logical disk information is generated. Details thereof will be described below.

[Operation S102] The relevant metadata of the virtual slice is sent to the disk nodes 200, 300, and 400 for managing the virtual slice to which the segment of the duplicate logical disk is allocated in operation S101, and a metadata change is instructed.

The disk nodes 200, 300, and 400 obtaining the metadata store the obtained metadata in the metadata storage area to update the metadata. Then, the normal response is returned to the control node 100.

[Operation S103] Responses from the disk nodes 200, 300, and 400 performing the metadata change instruction in operation S102 are waited for. When the responses are received from all the disk nodes 200, 300, and 400, or a response wait time period elapses a certain period of time, the processing advances to the next operation.

[Operation S104] It is determined whether or not the responses from all the disk nodes 200, 300, and 400 are received and also whether or not the received responses are the normal responses. When all the received responses are the normal response, the processing advances to operation S105. When there is no response or any one of responses is not the normal response, the processing advances to operation S106.

[Operation S105] When the normal responses are received from all the disk nodes, it is determined that the duplicate logical disk generation is ended. The duplicate logical disk creation end notification is returned to the management node 700, and the processing is ended.

[Operation S106] When the normal responses cannot be received from all the disk nodes, an error processing is performed, and the processing is ended. Again, the processing may return to operation S101, and the procedure from the duplicate logical disk generation processing may also be performed.

As the above-mentioned processing procedure is executed, the duplicate logical disk is generated, and the virtual slice is allocated to the duplicate logical segment.

Figure 21:
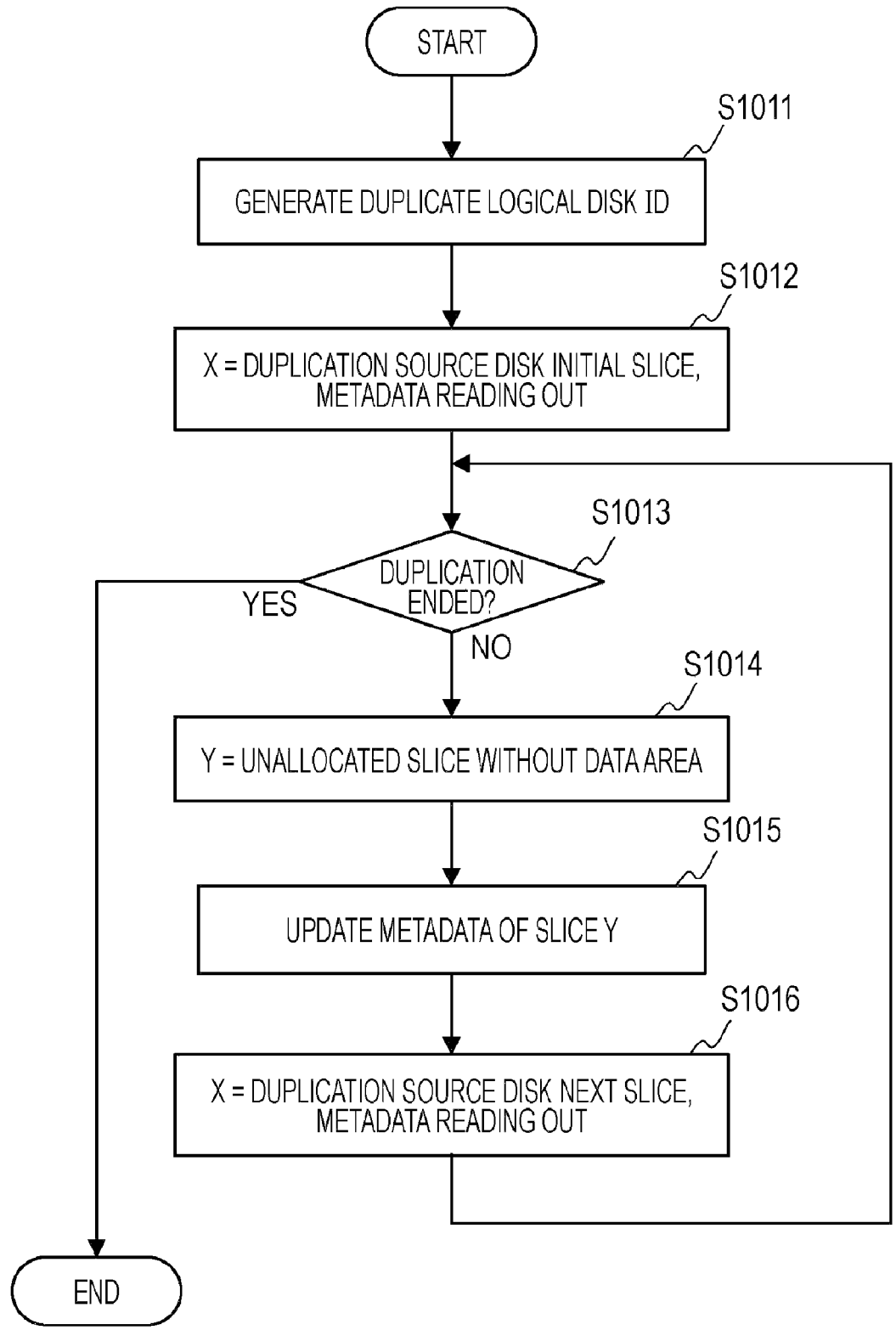
FIG. 21 is a flow chart showing a procedure of a duplicate logical disk creating processing.

Herein, the duplicate logical disk generation processing is described. FIG. 21 is a flow chart showing a procedure of the duplicate logical disk generation processing.

[Operation S1011] An ID for distinguishing the duplicate logical disk to be created is generated. The generated ID is set in the logical disk ID of the logical disk information of the metadata related to the slice allocated to the duplicate logical segment of this duplicate logical disk.

[Operation S1012] An initial slice which is allocated to the segment whose initial address of the logical disk at the duplication source is the smallest and stores the data of the segment is set as X. Thus, a duplication processing is sequentially performed for the addresses of the logical disks at the duplication source in an ascending order. It is noted that the duplication processing herein is a processing for allocating the virtual slices to all the areas of the duplicate logical disk. The metadata related to the slice specified as this initial slice.

[Operation S1013] It is determined whether or not the duplication processing is ended for all the slices corresponding to all the areas of the logical disk at the duplication source. When there is a slice where the duplication is not ended, the processing advances to operation S1014. When the duplication for all the slices is ended, the processing is ended.

[Operation S1014] When the duplication for all the slices is not ended, as a slice allocated to the duplicate logical disk, a virtual slice where the logical disk and the duplicate logical disk is unallocated is searched for among the virtual slices without the data area. The metadata is collated, and the slice where the data area flag is "FALSE" and the logical disk allocation flag is "NULL" is searched for. Thus, one of the searched unallocated virtual slices is selected, and this virtual slice is set as Y.

[Operation S1015] The metadata of the virtual slice Y selected in operation S1014 is updated. To be more specific, as to the metadata where the virtual slice Y is registered in the slice access information, the logical disk allocation flag is set as "TRUE", and the duplicate slice flag is set as "TRUE". With this configuration, to the unallocated area of the duplicate logical disk, the virtual slice Y is allocated. Next, the ID for distinguishing the duplicate logical disk set in operation S1011 is set in the logical disk ID of the logical disk information. In the initial address, an address of the slice X is set. In the duplicate source logical disk information, the logical disk information of the slice X is set.

[Operation S1016] The slice X of the logical disk at the duplication source is set in a slice at the next address. Then, the metadata related to this slice is read out, and the processing advances to operation S1013.

In this manner, the virtual slice which is unallocated at this time point is allocated to the duplicate logical disk, and the metadata is generated. Through the above-mentioned duplicate logical disk generation processing, only the metadata is updated, and the copy of the logical disk data is not performed.

Figure 22:
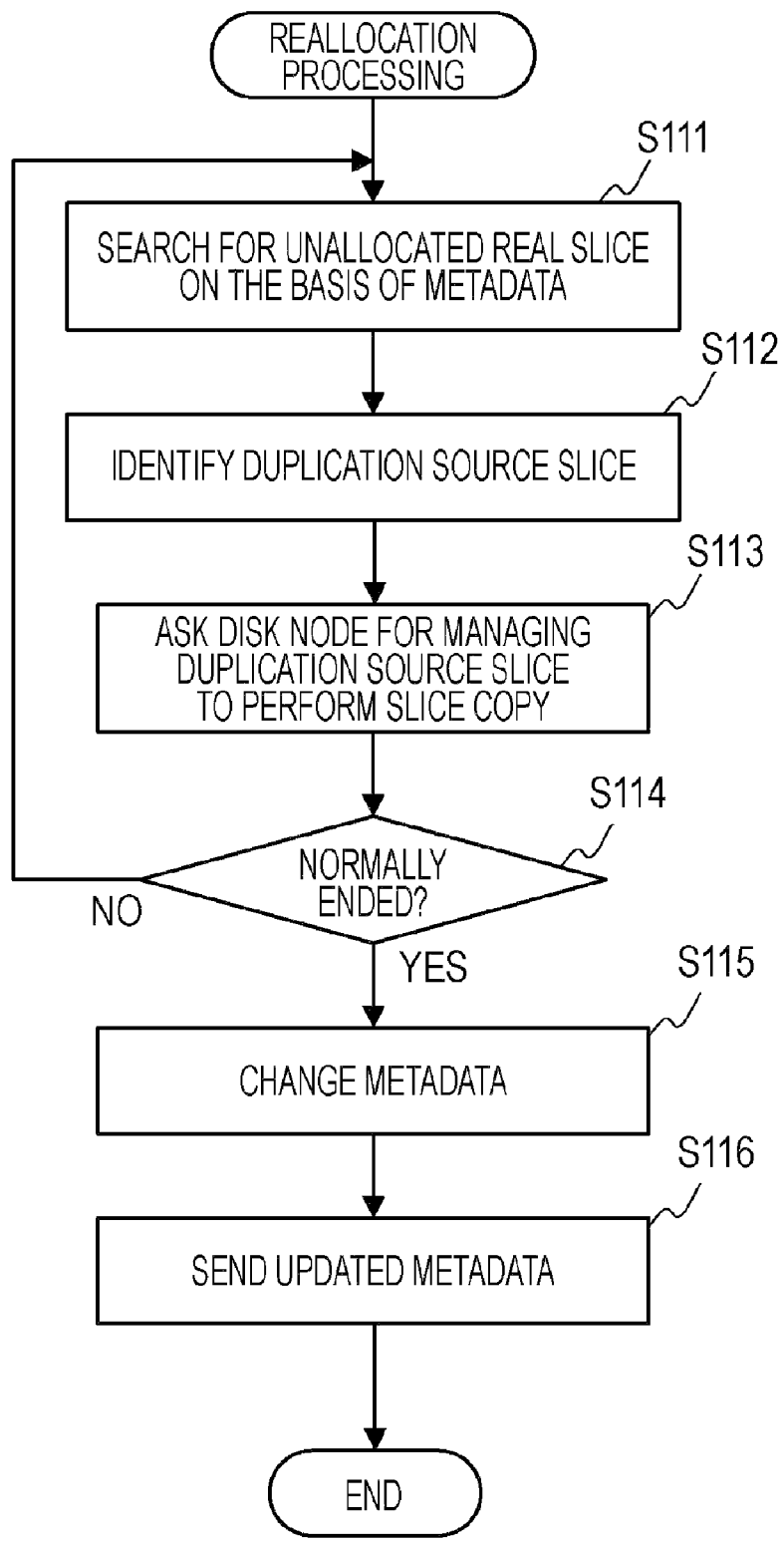
FIG. 22 is a flow chart showing a procedure of a reallocation processing of a control node.

Next, the slice reallocation processing of the duplicate logical disk by the control node 100 is described. FIG. 22 is a flow chart showing a procedure of the reallocation processing of the control node.

The reallocation request of the slice is received from the access node 500, and the processing is started.

[Operation S111] On the basis of the metadata 5001 held by the control node 100, the real slice unallocated to the logical disk and the duplicate logical disk is searched for. To be more specific, a slice in which the data area flag is "TRUE" (the real slice) and the logical disk allocation flag is "NULL" (unallocated) is searched for. Then, the detected real slice is set as an allocation candidate. When a plurality of real slices are detected, for example, the candidate is decided on such a condition that the number of slices allocated to the segment belonging to the same duplicate logical disk is small. For example, it is supposed that the real slice DP3-3 is identified from the metadata 5001.

[Operation S112] On the basis of the metadata 5001, the slice storing the data at the duplication source is identified. In the example of FIG. 15, on the basis of the duplicate source logical disk information of the duplicate logical segment LVOL2-A2 where the unallocation error is generated, the logical segment LVOL1-A2 at the duplication source is identified. Furthermore, the metadata 5001 is searched for, and the metadata where this logical segment LVOL1-A2 is registered in the logical disk information is extracted. Then, on the basis of the slice access information of the extracted metadata, the duplication source slice storing the data of this logical segment LVOL1-A2 is identified. In the example of FIG. 15, the slice DP2-1 is identified.

[Operation S113] The disk node (DP2) 300 for managing the duplication source slice DP2-1 detected in operation S112 is asked for the slice copy. The slice copy is asked while the reallocated real slice DP3-3 is set as the duplication destination in operation S111.

(In the disk node (DP2) 300 for managing the duplication source slice DP2-1 receiving the asking, the data stored in the real slice DP2-1 is transferred to the real slice at the duplication destination DP3-3, and writing is asked. At the normal end, the normal response is returned to the control node 100.)

The processing of the control node 100 will be described again.

[Operation S114] A response with respect to the slice copy is waited for from the disk node (DP2) 300 for managing the duplication source slice (DP2-1) in operation S113. When the response is obtained, and the processing is normally ended, the processing advances to operation S115. When the response is obtained but the processing is not normally ended or the response cannot be obtained even when a certain period of time elapses, the processing advances to operation S111, and the processing from the search for the next reallocation candidate is performed.

[Operation S115] When the slice copy is normally ended, the metadata is changed. The logical disk allocation flag of the metadata of the real slice at the duplication destination DP3-3 is set as "TRUE", the duplicate slice flag is set as "TRUE", the logical disk information is set as "LVOL2-A2", and the duplicate source logical disk information is set as "LVOL1-A2". Also, the allocation of the originally allocated virtual slice is cancelled. The logical disk allocation flag of the metadata of the virtual slice is set as "NULL", and associated information items are reset.

[Operation S116] The metadata changed in operation S115 is sent to the disk nodes 200, 300, and 400 for managing the associated slices to ask for the update of the metadata. At this time, the metadata in which the slice DP3-3 is allocated to the duplicate logical segment LVOL2-A2 is sent to the disk node (DP3) 400 to ask for the update. Also, the metadata in which the allocation of the slice DP1-102 is cancelled is sent to the disk node (DP1) 200 to ask for the update. Furthermore, the updated metadata is sent to the access node 500 together with a response for notifying that the reallocation is ended.

The above-mentioned processing procedure is performed. At the time of the new writing of the data to the virtual slice, the corresponding segment is reallocated to the real slice, and after the data at the duplication source is copied to the reallocated real slice, the data writing can be performed.

Next, a processing on the disk node side is described.

Figure 23:
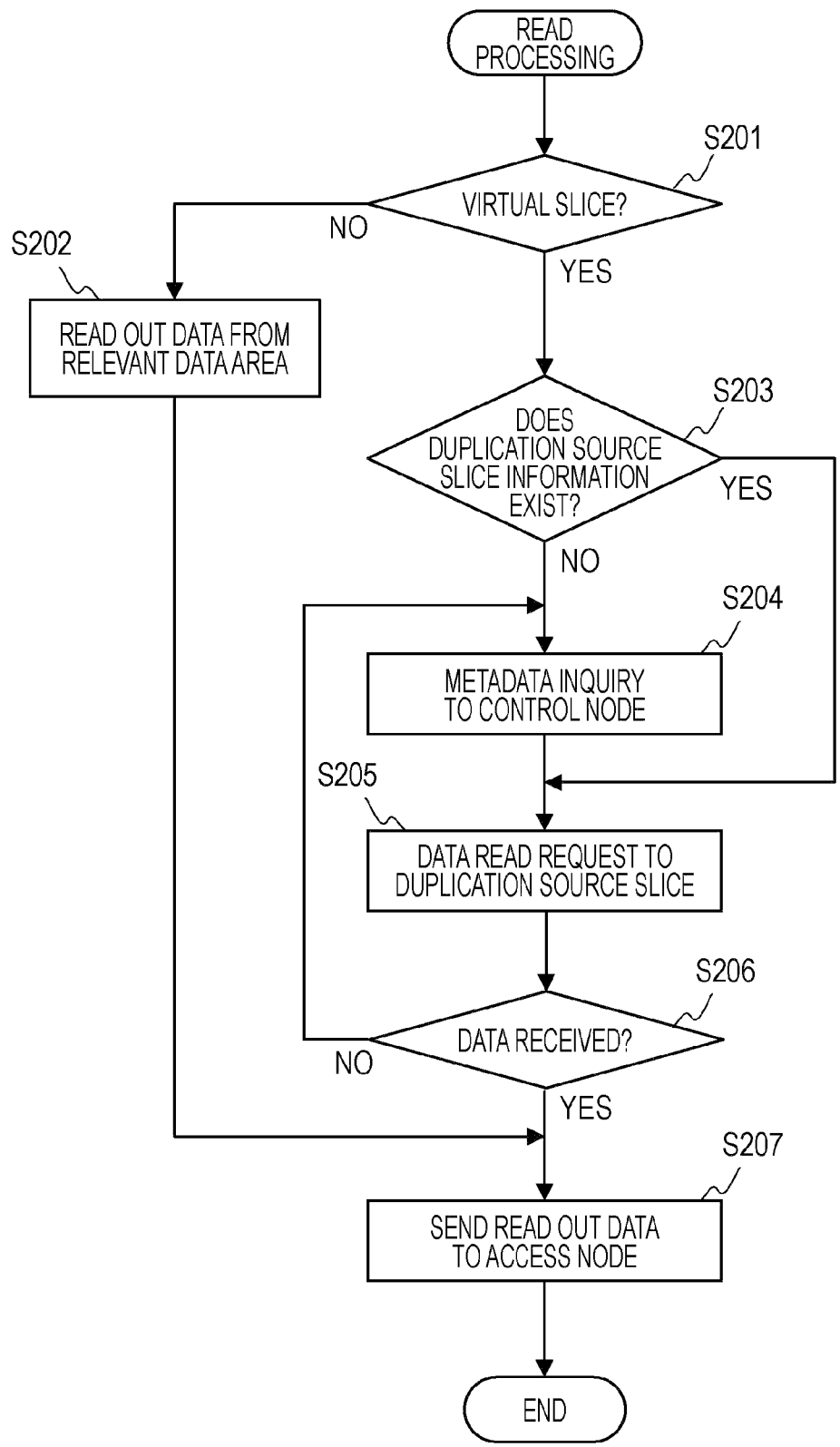
FIG. 23 is a flow chart showing a procedure of a read processing of a disk node.

FIG. 23 is a flow chart showing a procedure of a read processing of the disk node.

A read request from the access node 500 is received, and the processing is started.

[Operation S201] It is determined whether or not the slice corresponding to the data area where the read request occurs from the access node 500 is the virtual slice. The metadata of the slice including the data area is extracted, and the data area flag is checked. When the data area flag is "FALSE", this slice is the virtual slice, and the data area flag is "TRUE", this slice is the real slice. When this slice is the real slice, the processing advances to operation S202. When this slice is the virtual slice, the processing advances to operation S203.

[Operation S202] When the slice which is the target of the read request is the real slice, the data is read out from the relevant data area, and the processing advances to operation S207.

[Operation S203] When the target slice of the read request is the virtual slice, it is checked whether or not the duplication source slice information related to the slice at the duplication source exists. When the duplication source slice information does not exist, the processing advances to operation S204. When the duplication source slice information exists, the processing advances to operation S205.

[Operation S204] When the duplication source slice information does not exist, the duplicate source logical disk information related to this slice is read out from the metadata. Then, with respect to the control node 100, the duplication source logical disk is instructed to inquire the metadata. From the control node 100, the metadata including the slice access information of the slice storing the data of the inquired duplication source logical disk is obtained. In view of the above, the slice access information is extracted from the obtained metadata to be stored in the storage module as the duplication source slice information.

[Operation S205] The data read request is performed on the slice node for managing the duplication source slice registered in the duplication source slice information. The processing stands by until a response is received from the slice node or a response waiting time period elapses, and the processing advances to the next operation.

[Operation S206] It is determined whether or not the data can be normally received from the duplication source slice which is the target where the read request is performed in operation S205. When the data can be normally received, the processing advances to operation S207. When the data cannot be normally received, it is assumed that the slice storing the data of the logical segment at the duplication source is changed. In view of the above, the processing returns to operation S204, and the processing from the metadata inquiry related to the slice at the duplication source to the control node 100 is performed.

[Operation S207] The data read out from the relevant data area or the data read out from the duplication source slice is sent to the access node 500, and the processing is ended.

As the above-mentioned processing procedure is executed, the data in the relevant data area is read out to be sent to the read request from the access node 500. At this time, when the data area where the read request occurs exists in the real slice, the data is read out from the real slice as it is. On the other hand, the data area where when the read request occurs exists in the virtual slice, on the basis of the metadata, the data reading is transferred to the storage node which manages the duplication source slice, and the obtained data is set as read out data. In this manner, the access node 500 can perform the read request without checking whether the request destination is the virtual slice or the real slice.

Next, a procedure of a write related processing is described. The write related processing is related to a processing when the write request occurs and the write processing and refers to a processing when the copy of the data with respect to the reallocated slice is requested.

Figure 24:
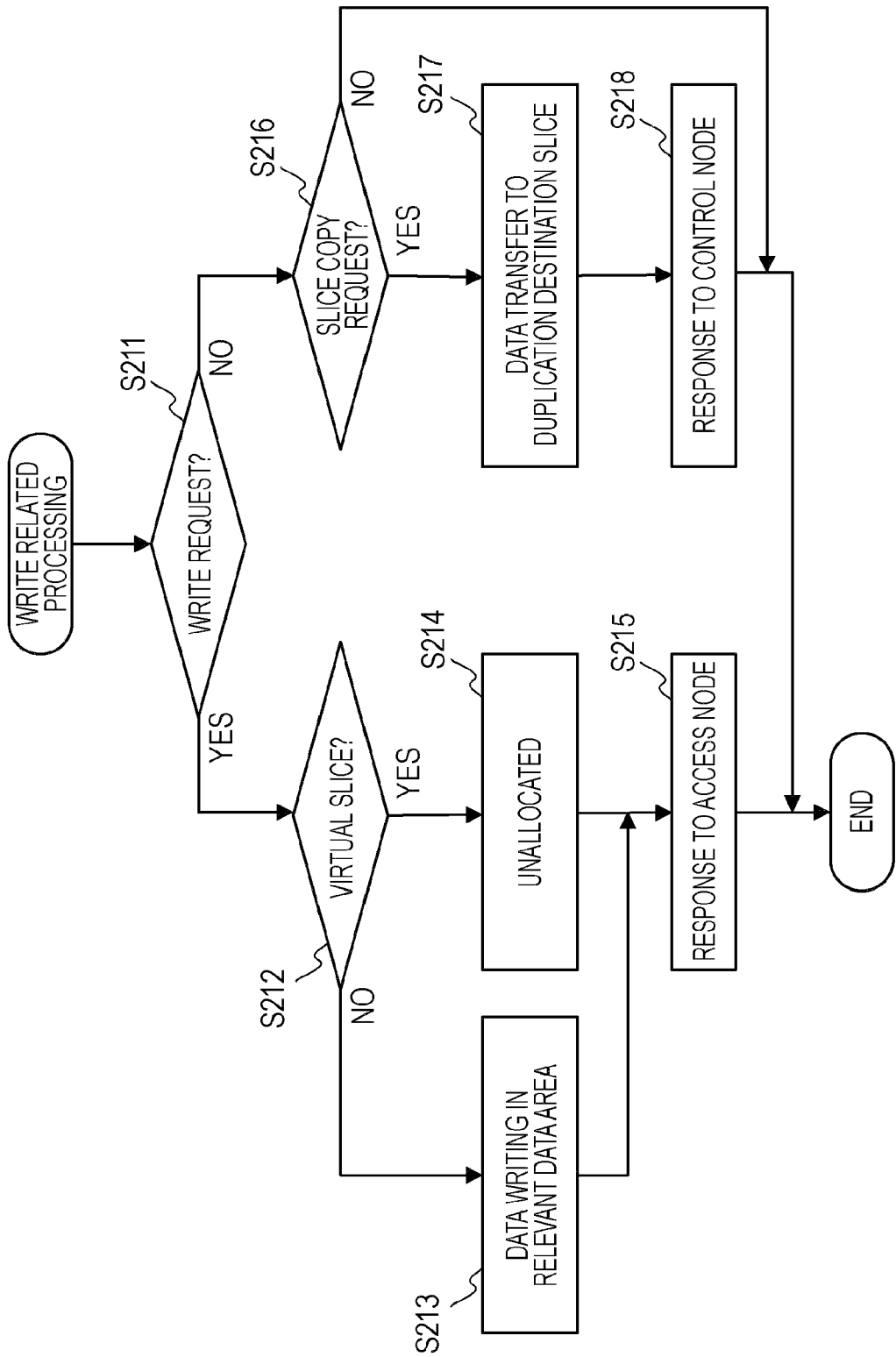
FIG. 24 is a flow chart showing a procedure of a write related processing of a disk node.

FIG. 24 is a flow chart showing a procedure of the write related processing of the disk node.

A write related processing request is received, and the processing is started.

[Operation S211] It is determined whether or not the received request is the write request. When the received request is the write request, the processing advances to operation S212. When the received request is not the write request, the processing advances to operation S216.

[Operation S212] When the received request is the write request, it is determined whether or not the slice corresponding to the data area which is the target of the write request is the virtual slice. The metadata of the slice including the data area is extracted to check the data area flag. When the data area flag is "FALSE", this slice is the virtual slice, and when the data area flag is "TRUE", this slice is the real slice. When this slice is the real slice, the processing advances to operation S213. When this slice is the virtual slice, the processing advances to operation S214.

[Operation S213] When the target slice of the write request is the real slice, the data is written in the relevant data area, and the processing advances to operation S215.

[Operation S214] When the target slice of the write request is the virtual slice, the unallocation is set.

[Operation S215] A response is returned to the access node performing the write request, and the processing is ended. When the data area of the writing target is the real slice, the data writing is performed, and a result thereof (normal end or error) is returned as a response. When the data area of the writing target is the virtual slice, the unallocation error indicating that the data area is not allocated is returned as a response.

[Operation S216] When the received request is not the write request, it is determined whether the request is the slice copy request. When the request is the slice copy request, the processing advances to operation S217. When the request is not the slice copy request, and the write related processing is ended.

[Operation S217] The data of the slice instructed as the duplication source slice is read out, and the data transfer processing for transferring the data to the duplication destination slice is performed.

[Operation S218] A response for notifying that the slice copy is ended is returned to the control node 100 requesting the slice copy.

As the above-mentioned processing procedure is executed, when the virtual slice has the write request, the real slice is reallocated to the corresponding logical segment, and the data of the slice at the duplication source is copied to the duplication destination.

As the above-mentioned processing procedure is executed, with respect to the write request from the access node 500, the data is written in the relevant data area. At this time, when the data area where the write request occurs exists in the real slice, the data is written in the real slice as it is. When the data area where the write request occurs exists in the virtual slice, the unallocation error is once generated, but due to the unallocation error, the corresponding logical segment is reallocated to the real slice. At this time, the slice node for managing the duplication source slice executes the slice copy for copying the data to the reallocated real slice at the duplication destination, and the data of the real slice at the duplication destination is matched with the duplication source slice.

According to the embodiment described above, the duplication of the logical volume is ended by allocating the virtual storage area without the data storage area to the duplicate logical volume divided area. As the duplicate logical volume is generated without the data copying, the duplication processing time for the logical volume can be shortened.

Also, when the writing request occurs in the duplicate logical volume divided area to which the virtual storage area is allocated, the real storage area provided with the data storage area is reallocated to this duplicate logical volume divided area. Then, the data at the duplication source is copied to this real storage area. In this manner, the storage area is reallocated when needed, and it is possible to increase the use efficiency of the physical storage area of the storage apparatus.

It should be noted that the above-mentioned processing function can be realized by a computer. In that case, an allocation control program in which a processing content is described is provided. As the allocation control program is executed by the computer, the above-mentioned processing function is realized on the computer, which functions as the allocation control apparatus. The allocation control program in which the processing content is described can be recoded on a computer-readable recording medium.

In a case where the program is distributed, for example, a portable recording medium such as a DVD (Digital Versatile Disc) or CD-ROM (Compact Disc Read Only Memory) on which the program is recorded is marketed. Also, as the program is stored in a storage apparatus of a server computer, and via a network, the program can also be transferred to another computer from the server computer.

The computer for executing the program stores, for example, the program recorded on the portable recording medium or the program transferred from the server computer in its own storage apparatus. Then, the computer reads the program from its own storage apparatus and executes a program following the program. It should be noted that the computer can also read the program directly from the portable recording medium and execute the program following the program. Also, each time the program is transferred from the server computer, the computer can also sequentially execute the processing following the received program.

As such, the embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention, the scope of which is defined in the claims and their equivalents.

What is claimed is:

1. A computer-readable recording medium encoded with an allocation control program containing instructions executable on a computer, the allocation control program dispersedly arranging a logical volume in a plurality of storage apparatuses, the program causing the computer to execute an operation, the operation comprising:
a logical volume generation procedure including:
allocating logical volume divided areas obtained by dividing the logical volume to real storage areas provided with a data storage area in a physical storage area of a storage apparatus group,
setting management information in which identification information of the allocated real storage areas is associated with identification information of the logical volume divided areas to be stored in a storage section,
allocating, at a time of duplicating the logical volume, duplicate logical volume divided areas obtained by dividing a generated duplicate logical volume to virtual storage areas which do not have the data storage area in the physical storage area of the storage apparatus group,
associating identification information of the allocated virtual storage areas, the identification information of the duplicate logical volume divided areas, and identification information of duplication source logical volume divided areas corresponding to the duplicate logical volume divided areas to be set in the management information, and
sending the management information to a storage management apparatus for managing an allocated virtual storage area; and
a reallocation procedure including:
detecting, when a data writing request to the duplicate logical volume divided area to which the virtual storage area is allocated occurs, based on the management information stored in the storage section, an unallocated area real storage area in the logical volume divided areas or the duplicate logical volume divided areas,
reallocating the real storage area to the duplicate logical volume divided area where the writing request occurs to update the management information,
identifying, based on the management information, the real storage area allocated to the duplication source logical volume divided area corresponding to the duplicate logical volume divided area, and
copying data stored in the real storage area to the real storage area allocated to the duplicate logical volume divided area.

2. The computer-readable recording medium according to claim 1, the operation comprising:
notifying the storage management apparatus for managing the real storage area allocated to the duplication source logical volume divided area, of the real storage area allocated to the duplicate logical volume divided area to perform a copying request, and
executing a data copying processing from the real storage area corresponding to the duplication source logical volume divided area to the real storage area corresponding to the duplicate logical volume divided area.

3. The computer-readable recording medium according to claim 1, wherein the reallocation procedure includes:
when an access apparatus performing a data writing request to the duplicate logical volume divided area to which the virtual storage area is allocated obtains a reallocation request on the real storage area which is sent when an error notifying that the real storage area is not allocated to the duplicate logical volume divided area is obtained, detecting that a data writing request to the duplicate logical volume divided area to which the virtual storage area is allocated occurs.

4. The computer-readable recording medium according to claim 1, wherein the reallocation procedure includes:
cancelling an allocation to the virtual storage area which is allocated before the reallocation to the duplicate logical volume divided area where reallocation to the real storage area is performed to update the management information, and
sending the updated management information to the storage management apparatus for managing the virtual storage area where the allocation is cancelled.

5. The computer-readable recording medium according to claim 1, the operation comprising:
executing a management information inquiry procedure including
reading, in accordance with a data reading request of the duplicate logical volume divided area to which the virtual storage area is allocated, data stored in the real storage area allocated to the duplication source logical volume divided area corresponding to the duplicate logical volume divided area,
searching for the management information stored in the storage section when the inquiry request of the management information related to the duplication source logical volume divided area is received from the storage management apparatus for transferring the read out data to the data reading request source,
extracting identification information of a duplication source real storage area allocated to the duplication source logical volume set in the management information in association with the identification information on the duplication source logical volume which receives the inquiry request, and
sending the identification information of the duplication source real storage area to the storage management apparatus.

6. An allocation control apparatus for dispersedly arranging and managing a logical volume in a plurality of storage apparatuses, comprising:
the allocation control apparatus implemented to communicate with a computer and including:
a logical volume generation unit for allocating logical volume divided areas obtained by dividing the logical volume to real storage areas provided with a data storage area in a physical storage area of a storage apparatus group, setting management information in which identification information of the allocated real storage areas is associated with identification information of the logical volume divided areas to be stored in a storage section, allocating, at a time of duplicating the logical volume, duplicate logical volume divided areas obtained by dividing a generated duplicate logical volume to virtual storage areas which do not have the data storage area in the physical storage area of the storage apparatus group, associating identification information of the allocated virtual storage areas, the identification information of the duplicate logical volume divided areas, and identification information of duplication source logical volume divided areas corresponding to the duplicate logical volume divided areas to be set in the management information, and sending the management information to a storage management apparatus for managing an allocated virtual storage area; and a reallocation unit for detecting, when a data writing request to the duplicate logical volume divided area to which the virtual storage area is allocated occurs, based on the management information stored in the storage section, an unallocated real storage area in the logical volume divided area or the duplicate logical volume divided area, reallocating the real storage area to the duplicate logical volume divided area where the writing request occurs to update the management information, identifying, based on the management information, the real storage area allocated to the duplication source logical volume divided area corresponding to the duplicate logical volume divided area, and copying data stored in the real storage area to the real storage area allocated to the duplicate logical volume divided area.

7. An allocation control method for an allocation control apparatus to dispersedly arrange a logical volume in a plurality of storage apparatuses, the allocation control method comprising:

instructing the allocation control apparatus to perform:

allocating logical volume divided areas obtained by dividing the logical volume to real storage areas provided with a data storage area in a physical storage area of a storage apparatus group, setting management information in which identification information of the allocated real storage areas is associated with identification information of the logical volume divided areas to be stored in a storage section, allocating, at a time of duplicating the logical volume, duplicate logical volume divided areas obtained by dividing a generated duplicate logical volume to virtual storage areas which do not have the data storage area in the physical storage area of the storage apparatus group, associating identification information of the allocated virtual storage areas, the identification information of the duplicate logical volume divided areas, and identification information of duplication source logical volume divided areas corresponding to the duplicate logical volume divided areas to be set in the management information, and sending the management information to a storage management apparatus for managing an allocated virtual storage area, detecting, when a data writing request to the duplicate logical volume divided area to which the virtual storage area is allocated occurs, based on the management information stored in the storage section, an unallocated real storage area in the logical volume divided area or the duplicate logical volume divided area, reallocating the real storage area to the duplicate logical volume divided area where the writing request occurs to update the management information, identifying, based on the management information, the real storage area allocated to the duplication source logical volume divided area corresponding to the duplicate logical volume divided area, and copying data stored in the real storage area to the real storage area allocated to the duplicate logical volume divided area.

8. The allocation control method according to claim 7, the allocation control method comprising:

instructing the storage management apparatus to perform requesting the management information related to the duplication source logical volume divided area corresponding to the duplicate logical volume divided area for the allocation control apparatus in accordance with a data reading request of the duplicate logical volume divided area to which the virtual storage area is allocated;

instructing the allocation control apparatus to perform searching for the management information stored in the storage section when an inquiry request to the management information related to the duplication source logical volume divided area is received, extracting identification information of a duplication source real storage area allocated to the duplication source logical volume set in the management information in associated with the identification information of the duplication source logical volume which receives the inquiry request, and sending the identification information of the duplication source real storage area to the storage management apparatus; and instructing the storage management apparatus to perform requesting, based on the identification information of the duplication source real storage area, a storage management apparatus for managing the duplication source real storage area to read out data stored in the duplication source real storage area, and transferring the read out data to the read reading request source.

9. The allocation control method according to claim 8, the allocation control method comprising:

instructing the storage management apparatus to perform;

generating duplication source information in which the identification information of the duplication source storage area obtained from the allocation control apparatus is associated with the duplication source logical volume divided area to be stored in the storage section, wherein the requesting procedure includes:

searching for the duplication source information stored in the storage section when the data reading request is obtained, identifying, when the duplication source information related to the duplication source logical volume divided area is detected, the duplication source real storage area based on the duplication source information, and performing an inquiry on the management information to the allocation control apparatus when the duplication source information related to the duplication source logical volume divided area is not detected.

* * * * *

UNITED STATES PATENT AND TRADEMARK OFFICE
CERTIFICATE OF CORRECTION

PATENT NO. : 8,230,191 B2  
APPLICATION NO. : 12/651522  
DATED : July 24, 2012  
INVENTOR(S) : Yasuo Noguchi et al.

Page 1 of 1

It is certified that error appears in the above-identified patent and that said Letters Patent is hereby corrected as shown below:

Column 32, Line 38, In Claim 8, delete "associated" and insert -- association --, therefor.

Signed and Sealed this  
Sixteenth Day of October, 2012

David J. Kappos  
*Director of the United States Patent and Trademark Office*